(12) United States Patent
Iverson et al.

(10) Patent No.: US 11,603,452 B2
(45) Date of Patent: *Mar. 14, 2023

(54) MULTIMODAL ETHYLENE-BASED POLYMER COMPOSITIONS HAVING IMPROVED TOUGHNESS

(71) Applicant: Dow Global Technologies LLC, Midland, MI (US)

(72) Inventors: Carl N. Iverson, Los Alamos, NM (US); Arnaldo T. Lorenzo, Tarragona (ES); Yijian Lin, Pearland, TX (US); Mehmet Demirors, Pearland, TX (US); Didem Oner-Deliormanli, Bellaire, TX (US); David T. Gillespie, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/956,144

(22) PCT Filed: Dec. 19, 2018

(86) PCT No.: PCT/US2018/066467
§ 371 (c)(1),
(2) Date: Jun. 19, 2020

(87) PCT Pub. No.: WO2019/133373
PCT Pub. Date: Jul. 4, 2019

(65) Prior Publication Data
US 2021/0230409 A1     Jul. 29, 2021

Related U.S. Application Data

(60) Provisional application No. 62/610,393, filed on Dec. 26, 2017.

(51) Int. Cl.
*C08F 210/16* (2006.01)
*C08F 2/00* (2006.01)
(Continued)

(52) U.S. Cl.
CPC ........ *C08L 23/0815* (2013.01); *C08F 210/16* (2013.01); *C08J 5/18* (2013.01);
(Continued)

(58) Field of Classification Search
CPC ...... C08L 23/16; C08L 23/08; C08L 23/0814; C08L 2205/03; C08F 2/01; C08F 2/06; C08F 4/64193; C08F 210/16; C08F 2/001
See application file for complete search history.

(56) References Cited

U.S. PATENT DOCUMENTS 3,645,992 A    2/1972   Elston
3,914,342 A    10/1975   Mitchell
(Continued)

FOREIGN PATENT DOCUMENTS

CA       2285723 A1    4/2021
CN     101796085 A    8/2010
(Continued)

OTHER PUBLICATIONS

International Search Report and Written Opinion pertaining to PCT/US2018/066452, dated Apr. 3, 2019.
(Continued)

*Primary Examiner* — Rip A Lee
(74) *Attorney, Agent, or Firm* — Dinsmore & Shohl LLP

(57) ABSTRACT

Embodiments of polymer compositions and articles comprising such compositions contain at least one multimodal ethylene-based polymer having at least three ethylene-based components, wherein the multimodal ethylene-based polymer exhibits improved toughness.

16 Claims, 4 Drawing Sheets

(51) Int. Cl.
  *C08F 4/76* (2006.01)
  *C08L 23/08* (2006.01)
  *C08J 5/18* (2006.01)
  *C08F 4/64* (2006.01)

(52) U.S. Cl.
  CPC .......... C08F 2/001 (2013.01); C08F 4/64193
     (2013.01); C08J 2323/08 (2013.01); C08L
     2203/16 (2013.01); C08L 2205/025 (2013.01);
     C08L 2205/03 (2013.01); C08L 2308/00
     (2013.01); C08L 2314/02 (2013.01)

(56) References Cited

U.S. PATENT DOCUMENTS

| | | |
|---|---|---|
| 4,076,698 A | 2/1978 | Anderson et al. |
| 4,314,912 A | 2/1982 | Lowery et al. |
| 4,547,475 A | 10/1985 | Glass et al. |
| 4,599,392 A | 7/1986 | McKinney et al. |
| 4,612,300 A | 9/1986 | Coleman |
| 5,272,236 A | 12/1993 | Lai et al. |
| 5,278,272 A | 1/1994 | Lai et al. |
| 5,292,845 A | 3/1994 | Kawasaki et al. |
| 5,582,923 A | 12/1996 | Kale et al. |
| 5,684,097 A | 11/1997 | Palmroos et al. |
| 5,733,155 A | 3/1998 | Sagawa |
| 5,756,193 A | 5/1998 | Yamamoto et al. |
| 6,277,931 B1 | 8/2001 | Jaber et al. |
| 6,306,969 B1 | 10/2001 | Patel et al. |
| 6,399,722 B1 | 6/2002 | Szul |
| 6,566,450 B2 | 5/2003 | Debras et al. |
| 6,579,922 B2 | 6/2003 | Laurent |
| 6,812,289 B2 | 11/2004 | Van Dun et al. |
| 6,869,904 B2 | 3/2005 | Boussie et al. |
| 7,030,256 B2 | 4/2006 | Boussie et al. |
| 7,135,526 B2 | 11/2006 | Farley et al. |
| 7,473,745 B2 | 1/2009 | Chandrashekar |
| 7,505,126 B2 | 3/2009 | Ninomiya et al. |
| 7,829,641 B2 | 11/2010 | Etherton |
| 8,058,373 B2 | 11/2011 | Stevens et al. |
| 8,076,428 B2 | 12/2011 | Shim et al. |
| 8,101,696 B2 | 1/2012 | Konze et al. |
| 8,114,493 B2 | 2/2012 | Sherman, Jr. et al. |
| 8,278,393 B2 | 10/2012 | Nummila-Pakarinen et al. |
| 8,445,599 B2 | 5/2013 | Gustafsson et al. |
| 8,557,931 B2 | 10/2013 | Brita et al. |
| 8,663,790 B2 | 3/2014 | Berthold et al. |
| 8,673,437 B2 | 3/2014 | Berthold et al. |
| 8,674,026 B2 | 3/2014 | Shim et al. |
| 8,703,885 B2 | 4/2014 | Dewachter |
| 8,722,802 B2 | 5/2014 | Berthold et al. |
| 8,722,833 B2 | 5/2014 | Kipke et al. |
| 8,912,276 B2 | 12/2014 | Noopila et al. |
| 9,000,095 B2 | 4/2015 | Berthold et al. |
| 9,029,487 B2 | 5/2015 | Klosin et al. |
| 9,051,458 B2 | 6/2015 | Berthold et al. |
| 9,090,761 B2 | 7/2015 | Mannebach et al. |
| 9,187,627 B2 | 11/2015 | Mehta |
| 9,234,061 B2 | 1/2016 | Vahteri et al. |
| 9,359,494 B2 | 6/2016 | McLeod et al. |
| 9,371,407 B2 | 6/2016 | Yang et al. |
| 9,441,056 B2 | 9/2016 | Maus et al. |
| 9,493,590 B2 | 11/2016 | Berthold et al. |
| 9,505,893 B2 * | 11/2016 | Wang .................. C08F 4/6585 |
| 9,512,282 B2 * | 12/2016 | Li ............................ C08F 2/06 |
| 9,650,454 B2 | 5/2017 | Prang et al. |
| 9,708,479 B2 | 7/2017 | Hjertberg et al. |
| 9,890,273 B2 | 2/2018 | Sandkuehler |
| 9,963,529 B1 | 5/2018 | Kazemi |
| 9,982,077 B2 * | 5/2018 | Bellehumeur ........ C08F 110/02 |
| 9,988,505 B2 | 6/2018 | Gao |
| 10,023,706 B2 * | 7/2018 | Bellehumeur .......... B29C 41/04 |
| 10,442,920 B2 | 10/2019 | Zhang |
| 10,442,921 B2 * | 10/2019 | Zhang ................... C08F 210/16 |
| 10,538,654 B2 * | 1/2020 | Wang ................... C08L 23/0815 |
| 10,544,245 B1 | 1/2020 | Vantomme et al. |
| 10,577,491 B2 | 3/2020 | Fereydoon et al. |
| 10,626,256 B2 | 4/2020 | Sibtain et al. |
| 10,919,991 B2 | 2/2021 | Jarumaneeroj et al. |
| 10,941,223 B2 | 3/2021 | Mattayan et al. |
| 11,001,649 B2 | 5/2021 | Suchao-In et al. |
| 11,180,586 B2 | 11/2021 | Äärilä |
| 2009/0252910 A1 | 10/2009 | Baeckman et al. |
| 2010/0016526 A1 | 1/2010 | Etherton et al. |
| 2010/0076136 A1 | 3/2010 | Vogt |
| 2013/0167486 A1 | 7/2013 | Aarnio et al. |
| 2013/0243990 A1 | 9/2013 | Berthold et al. |
| 2016/0032088 A1 | 2/2016 | Mehta |
| 2016/0095499 A1 | 4/2016 | Trollsas et al. |
| 2017/0158789 A1 | 6/2017 | Bellehumeur et al. |
| 2017/0267822 A1 | 9/2017 | Bellehumeur et al. |
| 2017/0326853 A1 | 11/2017 | Lee et al. |
| 2020/0010655 A1 | 1/2020 | Äärilä et al. |
| 2020/0056022 A1 | 2/2020 | Mattayan et al. |
| 2020/0071508 A1 | 3/2020 | Hjärtfors et al. |
| 2020/0165366 A1 | 5/2020 | Li et al. |
| 2020/0392269 A1 | 12/2020 | Ferrari |
| 2021/0079138 A1 | 3/2021 | Wang et al. |
| 2021/0102051 A1 * | 4/2021 | Demirors ................... C08J 5/18 |

FOREIGN PATENT DOCUMENTS

| | | |
|---|---|---|
| CN | 102083870 A | 6/2011 |
| CN | 102083902 A | 6/2011 |
| CN | 102762607 A | 10/2012 |
| CN | 102869716 A | 1/2013 |
| CN | 102884121 A | 1/2013 |
| CN | 104395394 A | 3/2015 |
| CN | 104884485 A | 9/2015 |
| CN | 107074995 A | 8/2017 |
| CN | 107075026 A | 8/2017 |
| CN | 107207659 A | 9/2017 |
| EP | 989141 A1 | 3/2000 |
| EP | 2185611 A2 | 3/2009 |
| EP | 2185611 A2 | 5/2010 |
| EP | 1920179 B1 | 2/2011 |
| EP | 2415598 B1 | 2/2014 |
| EP | 2860203 B1 | 12/2016 |
| EP | 3257895 A1 | 12/2017 |
| JP | H09087328 A | 1/1996 |
| JP | 2001026684 A | 1/2001 |
| JP | 2008544068 A | 12/2008 |
| JP | 2009514991 A | 4/2009 |
| JP | 2011511096 A | 4/2011 |
| JP | 2016504442 A | 2/2016 |
| JP | 2016505694 A | 2/2016 |
| JP | 2017531725 A | 10/2017 |
| JP | 2017535636 A | 11/2017 |
| JP | 2020517767 A | 6/2020 |
| WO | 9308221 A2 | 4/1993 |
| WO | 199945046 A1 | 9/1999 |
| WO | 200017244 A1 | 3/2000 |
| WO | 0140330 A1 | 6/2001 |
| WO | 200140330 A1 | 6/2001 |
| WO | 2007030278 A1 | 3/2007 |
| WO | 2007101047 A2 | 9/2007 |
| WO | 2009031798 A2 | 3/2009 |
| WO | 2009035580 A1 | 3/2009 |
| WO | 2009040139 A1 | 4/2009 |
| WO | 2009071323 A1 | 11/2009 |
| WO | 2011092263 A1 | 8/2011 |
| WO | 2011092266 A1 | 8/2011 |
| WO | 2012170526 A2 | 12/2012 |
| WO | 2013144328 A1 | 10/2013 |
| WO | 2014003926 A1 | 1/2014 |
| WO | 2014074596 A1 | 5/2014 |
| WO | 2014099307 A1 | 6/2014 |
| WO | 2014106017 A2 | 7/2014 |
| WO | 2015154253 A1 | 10/2015 |
| WO | 2015200740 A2 | 12/2015 |
| WO | 2015200742 A1 | 12/2015 |
| WO | 2015200743 A1 | 12/2015 |
| WO | 2016063164 A2 | 4/2016 |
| WO | 2016063200 A1 | 4/2016 |
| WO | 2016063205 A2 | 4/2016 |

(56) References Cited

FOREIGN PATENT DOCUMENTS

| WO | 2016198271 A1 | 12/2016 |
| WO | 2016198273 A1 | 12/2016 |
| WO | 2017172102 A1 | 10/2017 |
| WO | 2018193327 A1 | 10/2018 |
| WO | 2018193328 A1 | 10/2018 |
| WO | 2018193331 A1 | 10/2018 |
| WO | 2018193375 A1 | 10/2018 |

OTHER PUBLICATIONS

International Search Report and Written Opinion pertaining to PCT/US2018/066462, dated Apr. 8, 2019.
International Search Report and Written Opinion pertaining to PCT/US2018/066467, dated Apr. 9, 2019.
International Search Report and Written Opinion pertaining to PCT/US2018/066475, dated Apr. 3, 2019.
International Search Report and Written Opinion pertaining to PCT/US2018/066549, dated Apr. 3, 2019.
Monrabal et al., "Crystallization Elution Fractionation. A New Separation Process for Polyolefin Resins", Macromol. Symp., 2007, 257, 71-79.
Odian, George, "Stereochemistry of Polymerization", Principles of Polymerization, Chapter, 8, Second Edition, John Wiley and Sons, 1970.
Randall, J.C., "A Review of High Resolution Liquid Carbon Nuclear Magnetic Resonance Characterizations of Ethylene-Based Polymers", Rev. Macromol. Chem. Phys., 1989, C29, 201-317.
Soave, Giorgio, "Equilibrium Constants from a Modified Redlich-Kwong Equation of State", Chemical Engineering Science, 1972, pp. 1197-1203.
Williams et al., "The Construction of a Polyethylene Calibration Curve for Gel Permeation Chromatography Using Polystyrene Fractions", J. Polym. Sci., 1968, Polym. Let., 6, 621.
International Search Report and Written Opinion pertaining to PCT/US2018/066581, dated Apr. 8, 2019.
Non-Final Office Action dated Mar. 25, 2022, pertaining to U.S. Appl. No. 16/956,231.
Non-Final Office Action dated Mar. 22, 2022, pertaining to U.S. Appl. No. 16/956,083.
Non-Final Office Action dated Mar. 23, 2022, pertaining to U.S. Appl. No. 16/956,218.
Brazil Office Action dated May 31, 2022, pertaining to BR Patent Application No. BR112020012805-8, 6 pgs.
U.S. Notice of Allowance and Fee(s) Due dated Mar. 30, 2022 pertaining to U.S. Appl. No. 16/956,110, filed Jun. 19, 2020, 24 pages.
Brazil Office Action dated Jun. 22, 2022, pertaining to BR Patent Application No. BR112020012842-2, 6 pgs.
Chinese Office Action dated Aug. 3, 2022, pertaining to CN Patent Appliction No. 201880080083.6, 13 pgs.
U.S. Office Action dated Jul. 22, 2022, pertaining to U.S. Appl. No. 16/956,176, 15 pgs.
U.S. final Office Action dated Jul. 28, 2022, pertaining to U.S. Appl. No. 16/956,083 6 pages.
Notice of Allowance dated Sep. 6, 2022, pertaining to U.S. Appl. No. 16/956,231, 30 pgs.
Non-Final Office Action dated Oct. 12, 2022, pertaining to U.S. Appl. No. 16/956,083, 23 pgs.
Translation of Chinese Office Action dated Aug. 31, 2022, pertaining to Chinese Patent Application No. 201880087926.5, 6 pgs.
Japanese Office Action dated Oct. 18, 2022, pertaining to Japanese Patent Application No. 2020-532713, 7 pgs.
Chinese Office Action, dated Aug. 22, 2022, pertaining to Chinese Patent Application No. 201880081151.0, 2 pgs.
Chinese Search Report, dated Aug. 22, 2022, pertaining to Chinese Patent Application No. 201880081151.0, 2 pgs.
Japanese Office Action dated Oct. 25, 2022, pertaining to JP Patent Application No. 2020-532564, 6 pgs.
Japanese Office Action dated Nov. 29, 2022, pertaining to JP Patent Application No. 2020-532811, 18 pgs.
Japanese Office Action dated Nov. 29, 2022, pertaining to JP Patent Application No. 2020-532821, 26 pgs.
Japanese Office Action dated Dec. 6, 2022, pertaining to JP Patent Application No. 2020-533064, 18 pgs.
Notice of Allowance dated Oct. 18, 2022, pertaining to U.S. Appl. No. 16/956,144 filed , 7 pgs.
U.S. Office Action dated Jul. 28, 2022 pertaining to U.S. Appl. No. 16/956,083, 4 pages.
U.S. Office Action dated Nov. 29, 2022 pertaining to U.S. Appl. No. 16/956,218, filed Jun. 19, 2020, 7 pages.
U.S. Final Office Action dated Dec. 12, 2022 pertaining to U.S. Appl. No. 16/956,176, filed Jun. 19, 2020, 14 pages.
Japanese Search Report dated Oct. 19, 2022, pertaining to JP Patent Application No. 2020-532713, 18 pgs.
Translation of Chinese Office Action and Search Report dated Oct. 13, 2022, pertaining to CN Patent Application No. 201880088507.3, 16 pgs.

* cited by examiner

MULTIMODAL ETHYLENE-BASED POLYMER COMPOSITIONS HAVING IMPROVED TOUGHNESS

CROSS-REFERENCE TO RELATED APPLICATIONS

This application is a National Stage Entry under 35 U.S.C. 071 of International Patent Application No. PCT/US2018/066467, filed Dec. 19, 2018, which claims priority to U.S. Provisional Application Ser. No. 62/610,393, filed Dec. 26, 2017, both of which are hereby incorporated by reference in their entireties.

TECHNICAL FIELD

Embodiments of the present disclosure generally relate to ethylene-based polymers compositions, and more specifically relate to multimodal ethylene-based polymer compositions possessing a superior balance of toughness and other physical properties.

BACKGROUND

In monolayer and multilayer films, which may include blown or cast films, it is beneficial for the films to have superior physical performance in a variety of different environments and conditions. However, to ensure the polymer resins have sufficient stiffness, there is often a trade-off in toughness.

SUMMARY

Accordingly, ongoing needs exist for multimodal ethylene-based polymer compositions with improved physical performance. The present multimodal ethylene-based polymers meet these needs and display a superior balance of physical performance (for example, dart strength and secant modulus).

According to at least one embodiment of the present disclosure, a polymer composition is provided. The composition includes at least one multimodal ethylene-based polymer. Overall, the multimodal ethylene-based polymer has a density from 0.900 to 0.940 g/cc when measured according to ASTM D792 and a melt index ($I_2$) from 0.1 to 10 g/10 min when measured according to ASTM D1238 at a load of 2.16 kilograms (kg) and a temperature of 190 degrees Celsius (° C.). The multimodal ethylene-based polymer comprises three ethylene-based components, which are polymerized reaction products of an ethylene monomer and at least one $C_3$-$C_{12}$ α-olefin comonomer.

The first ethylene-based component has a density of 0.860 to 0.915 g/cc, and a weight-average molecular weight ($M_{w(GPC)}$) of 128,000 g/mol to 363,000 g/mol. The multimodal ethylene-based polymer may comprise at least 20% by weight of the first ethylene-based component. The second ethylene-based component has a density greater than the density of the first ethylene-based component and less than 0.940 g/cc, and a weight-average molecular weight ($M_{w(GPC)}$) of 88,500 g/mol to 363,000 g/mol. The third ethylene-based component has a density greater than the density of the second ethylene-based component.

Finally, according to other embodiments, articles comprising the polymer compositions above are provided.

These and other embodiments are described in more detail in the following Detailed Description.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
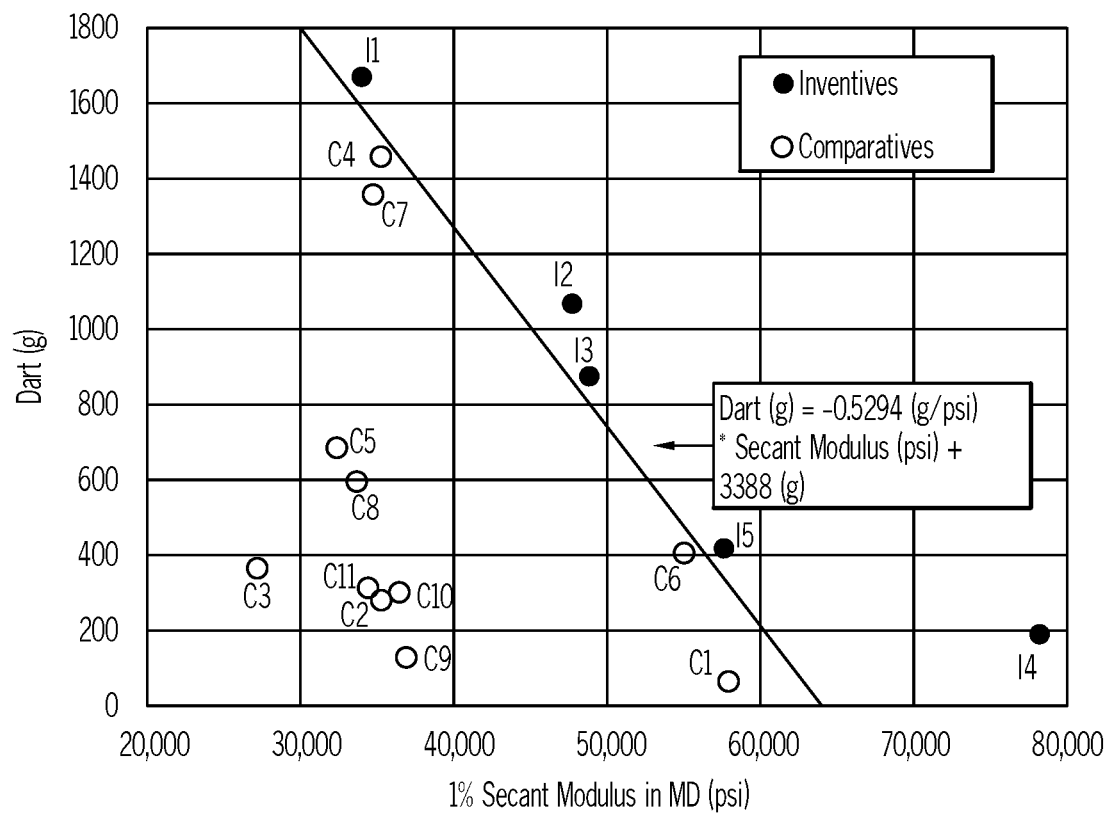
FIG. 1 is a graphical illustration depicting the 1% secant modulus versus Dart A for various Inventive and Comparative monolayer film examples.

Specific embodiments of the present application will now be described. The disclosure may, however, be embodied in different forms and should not be construed as limited to the embodiments set forth in this disclosure. Rather, these embodiments are provided so that this disclosure will be thorough and complete and will fully convey the scope of the subject matter to those skilled in the art.

Definitions

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer," which refers to polymers prepared from two or more different monomers. The term "interpolymer," as used herein, refers to a polymer prepared by the polymerization of at least two different types of monomers. The generic term interpolymer thus includes copolymers and polymers prepared from more than two different types of monomers, such as terpolymers.

As used herein, "multimodal" means compositions that can be characterized by having at least three (3) polymer subcomponents with varying densities and weight averaged molecular weights and, optionally, may also have different melt index values. In one embodiment, multimodal may be defined by having at least three distinct peaks in a Gel Permeation Chromatography (GPC) chromatogram showing the molecular weight distribution. In another embodiment, multimodal may be defined by having at least three distinct peaks in a Crystallization Elution Fractionation (CEF) chromatogram showing the short chain branching distribution. Multimodal includes resins having three peaks as well as resins having more than three peaks.

The term "trimodal polymer" means a multimodal ethylene-based polymer having three primary components: a first ethylene-based polymer component, a second ethylene-based polymer component, and a third ethylene-based polymer component.

As used herein, the "solution polymerization reactor" is a vessel, which performs solution polymerization, wherein ethylene monomer and at least $C_3$-$C_{12}$ α-olefin comonomer copolymerize after being dissolved in a non-reactive solvent that contains a catalyst. In the solution polymerization process, hydrogen may be utilized; however, it is not required in all solution polymerization processes.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

"Ethylene-based component," for example, the "first ethylene-based component," the "second ethylene-based component," or the "third ethylene-based component," refer to subcomponents of the multimodal or trimodal polymer, wherein each subcomponent is an ethylene interpolymer comprising ethylene monomer and $C_3$-$C_{12}$ α-olefin comonomer.

The term "LDPE" may also be referred to as "high pressure ethylene polymer" or "highly branched polyethylene" and is defined to mean that the polymer is partly or entirely homopolymerized or copolymerized in an autoclave or tubular reactors at pressures above 14,500 psi (100 MPa) with the use of free-radical initiators, such as peroxides (see, for example, U.S. Pat. No. 4,599,392, which is hereby incorporated by reference).

The term "LLDPE," includes resin made using Ziegler-Natta catalyst systems as well as resin made using single-site catalysts, including, but not limited to, bis-metallocene catalysts (sometimes referred to as "m-LLDPE"), phosphinimine, constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 or 5,854,045). The LLDPE resins can be made via gas-phase, solution-phase, or slurry polymerization or any combination thereof, using any type of reactor or reactor configuration known in the art.

"Multilayer structure" means any structure having more than one layer. For example, the multilayer structure (for example, a film) may have two, three, four, five or more layers. A multilayer structure may be described as having the layers designated with letters. For example, a three layer structure having a core layer B and two external layers A and C may be designated as A/B/C. Likewise, a structure having two core layers B and C and two external layers A and D would be designated A/B/C/D. In some embodiments, a multilayer film of the present invention comprises up to 11 layers.

Reference will now be made in detail to polymer composition embodiments of the present disclosure, where the compositions include at least one multimodal ethylene-based polymer.

As stated previously, the multimodal ethylene-based polymer may have a density from 0.900 to 0.940 g/cc measured according to ASTM D792. The multimodal ethylene-based polymer may also have a melt index from 0.1 to 10 g/10 min. In further embodiments, the ethylene-based polymer may have a density from 0.910 to 0.940 g/cc, or from 0.915 to 0.940 g/cc. Moreover, the multimodal ethylene-based polymer may have a melt index from 0.1 to 5.0 g/10 min, or from 0.3 to 2.0 g/10 min, or from 0.1 to 1.0 g/10 min, or from 0.5 to 1.0 g/10 min. Additionally, the multimodal ethylene-based polymer has an $I_{10}/I_2$ value from 9 to 15, where ho is measured according to ASTM D1238 at a load of 10 kg and temperature of 190° C. In further embodiments, the multimodal ethylene-based polymer has an $I_{10}/I_2$ from 9 to 14.

The multimodal ethylene-based polymer comprises the polymerized reaction product(s) of ethylene monomer and at least one $C_3$-$C_{12}$ α-olefin comonomer. In another embodiment, the $C_3$-$C_{12}$ α-olefin comonomer may more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may be selected from the group consisting of propylene, 1-butene, 1-hexene, and 1-octene, or in the alternative, from the group consisting of 1-butene, 1-hexene and 1-octene, and further 1-hexene and 1-octene.

Various incorporation levels of ethylene monomer and $C_3$-$C_{12}$ α-olefin comonomer are contemplated for the multimodal ethylene-based polymer. For example, the multimodal ethylene-based polymer may include at least 50% by mole ethylene monomer, or at least 60% by mole ethylene monomer, or at least 70% by mole ethylene monomer, or at least 80% by mole ethylene monomer, or at least 90% by mole ethylene monomer. Conversely, the multimodal ethylene-based polymer may comprise less than 50% by mole of the $C_3$-$C_{12}$ α-olefin comonomer. In further embodiments, the multimodal ethylene-based polymer may comprise from 1 to 40% by mole of the $C_3$-$C_{12}$ α-olefin comonomer, or from 1 to 30% by mole of the $C_3$-$C_{12}$ α-olefin comonomer, or from 1 to 20% by mole of the $C_3$-$C_{12}$ α-olefin comonomer, or from 1 to 10% by mole of the $C_3$-$C_{12}$ α-olefin comonomer.

The multimodal ethylene-based polymer comprises at least three ethylene-based components, which are each polymerized reaction products of an ethylene monomer and at least one $C_3$-$C_{12}$ α-olefin comonomer.

In further embodiments, the multimodal ethylene-based polymer may have a MWD ($M_{w(GPC)}/M_{n(GPC)}$) of at least 5, or at least 6, or at least 7. In further embodiments, the MWD is from 5 to 12, or from 6 to 10, or from 7 to 9.

The first ethylene-based component has a density of about 0.860 to 0.915 g/cc, and a $C_3$-$C_{12}$ comonomer incorporation of at least 0.5 mol. %. The densities for the ethylene-based components (for example, first, second, and third ethylene based components) are calculated from the equation provided below. In another embodiment, the first ethylene-based component has a density of 0.865 to 0.910 g/cc, or from 0.870 to 0.905 g/cc, or from 0.877 to 0.905 g/cc. Furthermore, in some embodiments, the melt index ($I_2$) of the first ethylene-based component is from 0.01 to 0.2 g/10 min, or from 0.01 to 0.1 g/10 min.

Moreover, in further embodiments, the first ethylene-based component may have an $M_{w(GPC)}$ of 128,000 to 363,000 g/mol, or from 150,000 to 360,000 g/mol, or from 200,000 to 355,000 g/mol, or from 225,000 to 350,000 g/mol. Additionally, the first ethylene-based component may have an $M_{n(GPC)}$ of 100,000 to 200,000 g/mol, or from 100,000 to 175,000 g/mol. In other embodiments, the first ethylene-based component may have an MWD ($M_{w(GPC)}$/$M_{n(GPC)}$) from 2.0 to 2.5.

Various additional amounts of $C_3$-$C_{12}$ α-olefin comonomer incorporation are contemplated for the first ethylene-based component. For example, the first ethylene-based component may have 1 to 30 mol. % of $C_3$-$C_{12}$ α-olefin comonomer, or from 2 to 20 mol. % of $C_3$-$C_{12}$ α-olefin comonomer.

The second ethylene-based component has a density greater than the density of the first ethylene-based component and less than 0.940 g/cc, and a $C_3$-$C_{12}$ α-olefin comonomer incorporation of at least 0.5 mol. %. In some embodiments, the density of the second ethylene-based component is from 0.880 to 0.930 g/cc, or from 0.890 to 0.930 g/cc, or from 0.895 to 0.925 g/cc. Furthermore, in some embodiments, the melt index of the second ethylene-based component is from 0.01 to 2 g/10 min, or from 0.1 to 1.5 g/10 min, or from 0.2 to 1.0 g/10 min.

Moreover, in further embodiments, the second ethylene-based component may have an $M_{w(GPC)}$ of 88,000 to 363,000 g/mol, 100,000 to 200,000 g/mol, or from 115,000 to 175,000 g/mol. Additionally, the second ethylene-based component may have an $M_{n(GPC)}$ of 50,000 to 90,000 g/mol, or from 55,000 to 80,000 g/mol. In other embodiments, the second ethylene-based component may have an MWD ($M_w$/$M_n$) of from 2.0 to 2.5.

It is also contemplated that the second ethylene-based component has various levels of $C_3$-$C_{12}$ α-olefin comonomer incorporation. In one embodiment, second ethylene-based component may have a lower $C_3$-$C_{12}$ α-olefin comonomer incorporation than the first ethylene-based component. For example, the second ethylene-based component may have 0.5 to 40 mol. % of $C_3$-$C_{12}$ α-olefin comonomer, or from 1 to 35 mol. % of $C_3$-$C_{12}$ α-olefin comonomer, or from 2 to 25 mol. % of $C_3$-$C_{12}$ α-olefin comonomer.

The third ethylene-based component has a density greater than the density of the second ethylene-based component, a melt index ($I_2$) of at least 2.0 g/10 min. In further embodiments, the third ethylene-based component has a melt index ($I_2$) of from 2.0 to 5000 g/10 min, or from 10 to 1000 g/10 min, or from 20 to 750 g/10 min. In some embodiments, the density of the third ethylene-based component is from 0.935 to 0.965 g/cc, or from 0.945 to 0.965 g/cc, or from 0.950 to 0.965 g/cc.

Moreover, in further embodiments, the third ethylene-based component may have an $M_{w(GPC)}$ of less than 88,500 g/mol or less than 60,000 g/mol. In further embodiments, the third ethylene-based component may have an $M_w$ from 10,000 to 60,000 g/mol, or from 15,000 to 50,000 g/mol. In further embodiments, the third ethylene-based component may have an $M_{n(GPC)}$ of 4,000 to 20,000 g/mol, or from 4,500 to 15,000 g/mol. In other embodiments, the third ethylene-based component may have an MWD ($M_{w(GPC)}$/$M_{n(GPC)}$) of at least 2.0, or from 2.5 to 6.0, or from 3.0 to 4.5.

The amount of each component in the multimodal ethylene-based polymer may be adjusted based on the application or use. For example, a different balance of properties may be desirable in low temperature applications (e.g., below 0° C.) versus applications where the multimodal ethylene-based polymer is subjected to higher temperatures (e.g., temperatures greater than 40° C.). In some embodiments, the multimodal ethylene-based polymer comprises from 20 to 40% by weight of the first ethylene-based component, or from 20 to 35% by weight of the first ethylene-based component. Additionally, in some embodiments, the multimodal ethylene-based polymer comprises from 10 to 40% by weight of the second ethylene-based component, or from 15 to 35% by weight of the second ethylene-based component. Moreover, in some embodiments, the multimodal ethylene-based polymer comprises 25 to 60% by weight of the third ethylene-based component, or from 35 to 60% by weight of the third ethylene-based component.

In further embodiments, the multimodal ethylene-based polymer has a Crystallization Elution Fractionation (CEF) weight fraction greater than 23% and a weight-average molecular weight ($M_{w(CEF)}$) greater than 100,000 g/mol at a temperature range from 20° C. to $T_{critical}(T_c)$. Without being bound by theory, this combination of CEF weight fraction and $M_{w(CEF)}$ within that temperature range may indicate a greater presence of the lower density first ethylene-based component. In a further embodiments, the multimodal ethylene-based polymer may have a CEF weight fraction greater than 21 wt % and a $M_w$ greater than 125,000 g/mol at a temperature range from 20° C. to $T_{critical}(T_c)$, or greater than 22 wt % and a $M_w$ greater than 150,000 g/mol at a temperature range from 20° C. to $T_{critical}(T_c)$.

Various polymerization process embodiments are considered suitable for producing the multimodal ethylene-based polymer. In one or more embodiments, the multimodal ethylene-based polymer is produced through a solution polymerization process in a dual reactor system. These dual solution polymerization reactors may be conventional reactors, e.g., loop reactors, isothermal reactors, adiabatic reactors, and continuous stirred tank reactors in parallel, series, and any combinations thereof. In one embodiment, the multimodal ethylene-based polymer may be produced in two loop reactors in series configuration, the first solution polymerization reactor temperature is in the range from 115 to 200° C., for example, from 135 to 165° C., and the second solution polymerization reactor temperature is in the range from 150 to 215° C., for example, from 185 to 202° C. In the solution polymerization process, ethylene monomer, one or more $C_3$-$C_{12}$ α-olefin comonomers, solvent, one or more catalyst systems, and optionally hydrogen, may be fed continuously to the dual solution polymerization reactors (i.e., the first and second solution polymerization reactors).

Various catalysts are considered suitable. These may include, but are not limited to, a Ziegler-Natta catalyst, a chromium catalyst, a metallocene catalyst, a post-metallocene catalyst, a constrained geometry complex (CGC) catalyst, a phosphinimine catalyst, or a bis(biphenylphenoxy) catalyst. Details and examples of CGC catalysts are provided in U.S. Pat. Nos. 5,272,236; 5,278,272; 6,812,289; and WO Publication 93/08221, which are all incorporated herein by reference in their entirety. Details and examples of bis(biphenylphenoxy) catalysts are provided in U.S. Pat. Nos. 6,869,904; 7,030,256; 8,101,696; 8,058,373; 9,029,487, which are all incorporated herein by reference in their entirety. The catalysts utilized in the solution polymerization reactors may vary in order to impart different properties to the first ethylene-based component, the second ethylene-based component, and the third ethylene-based component. For example, it is contemplated to use different catalysts in the solution polymerization reactors to vary the density, melt index, comonomer incorporation, etc. of the first, second, and third ethylene-based components. Without being bound by theory, varying these parameters for the first, second, and third ethylene-based components may enable the multimodal ethylene-based polymer to have a desired combination of toughness and stiffness.

In one or more embodiments, the first solution polymerization reactor, the second solution polymerization reactor, or both may include two catalysts. In a specific embodiment, the first solution polymerization reactor may include two catalysts and the second solution polymerization reactor, which is downstream of the first solution polymerization reactor, includes one catalyst. The two catalysts of the first solution polymerization reactor are homogeneous catalysts, whereas the catalyst of the second solution polymerization reactor could include a homogeneous catalyst, a heterogeneous catalyst, or both. Homogeneous, often referred to as single-site, catalysts are organometallic compounds that typically have a discrete molecular structure, and are used to generate polymers that have narrow molecular weight distribution, as well as narrow composition distribution, in the case where interpolymers are made. Homogeneous catalysts may be dissolved in a solution process, or supported, for use in particle forming processes, such as slurry or gas phase. Heterogeneous catalysts are not discrete compounds but rather result from a reaction mixture of metal compounds with precursors to form a complex, which has multiple active sites on some form of a particle. Polymers produced via heterogeneous catalysts typically demonstrate broader molecular weight distributions and, in the case of interpolymers, broader composition distributions than homogeneous catalysts. In exemplary embodiments, the catalysts in the first reactor may be different homogeneous catalysts having differing reactivity ratios in the first reactor environment.

The bis(biphenylphenoxy) catalyst is an example of a homogeneous catalyst. Other examples of homogeneous catalysts include constrained geometry catalysts. Examples of heterogeneous catalysts may include Ziegler-Natta catalysts, which are particularly useful at the high polymerization temperatures of the solution process. Examples of such Ziegler-Natta catalysts are those derived from organomagnesium compounds, alkyl halides or aluminum halides or hydrogen chloride, and a transition metal compound. Examples of such catalysts are described in U.S. Pat. No. 4,314,912 (Lowery, Jr. et al.), U.S. Pat. No. 4,547,475 (Glass et al.), and U.S. Pat. No. 4,612,300 (Coleman, III), the teachings of which are incorporated herein by reference.

Particularly suitable organomagnesium compounds include, for example, hydrocarbon soluble dihydrocarbylmagnesium such as the magnesium dialkyls and the magnesium diaryls. Exemplary suitable magnesium dialkyls include particularly n-butyl-secbutylmagnesium, diisopropylmagnesium, di-n-hexylmagnesium, isopropyl-n-butylmagnesium, ethyl-n-hexylmagnesium, ethyl-n-butylmagnesium, di-n-octylmagnesium and others wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides with the halogen-free organomagnesium compounds being more desirable.

Bis(biphenylphenoxy) catalysts are multi-component catalyst systems comprising a bis(biphenylphenoxy) procatalyst, cocatalyst, as well as further optional ingredients. The bis(biphenylphenoxy) procatalyst may include a metal-ligand complex according to Formula (I):

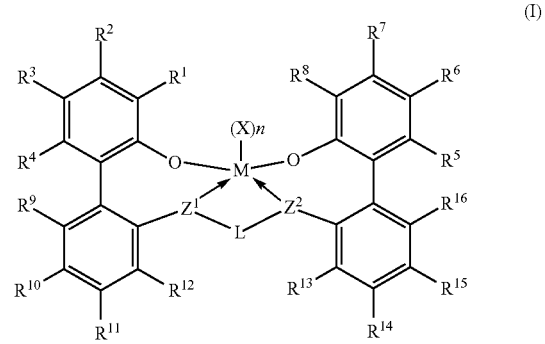

(I)

In Formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; O is O (an oxygen atom); each Z is independently chosen from —O—, —S—, —N($R^N$)—, or —P($R^P$)—; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), $S(O)_2$, $Si(R^C)_2$, $Ge(R^C)_2$, $P(R^C)$, or $N(R^C)$, wherein independently each $R^C$ is ($C_1$-$C_{30}$)hydrocarbyl or ($C_1$-$C_{30}$)heterohydrocarbyl; $R^1$ and $R^8$ are independently selected from the group consisting of ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS$(O)—, $R^CS(O)_2$—, $(R^C)_2C$=N—, $R^CC(O)O$—, $R^COC(O)$—, $R^CC(O)N(R^N)$—, $(R^N)_2NC(O)$—, halogen, and radicals having Formula (II), Formula (III), or Formula (IV):

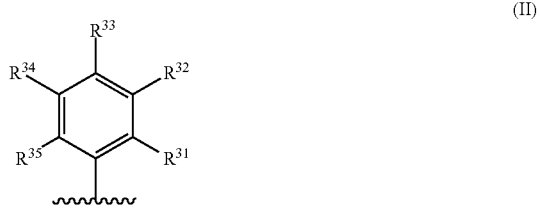

(II)

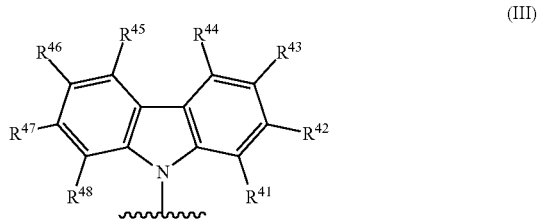

(III)

-continued

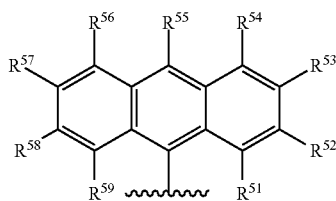

(IV)

In Formulas (II), (III), and (IV), each of $R^{31-35}$, $R^{41-48}$, or $R^{51-59}$ is independently chosen from $(C_1-C_{40})$hydrocarbyl, $(C_1-C_{40})$heterohydrocarbyl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R$^N$)—, (R$^N$)$_2$NC(O)—, halogen, or —H, provided at least one of $R^1$ or $R^8$ is a radical having Formula (II), Formula (III), or Formula (IV).

In Formula (I), each of $R^{2-4}$, $R^{5-7}$, and $R^{9-16}$ is independently selected from $(C_1-C_{40})$hydrocarbyl, $(C_1-C_{40})$heterohydrocarbyl, —Si(R$^C$)$_3$, —Ge(R$^C$)$_3$, —P(R$^P$)$_2$, —N(R$^N$)$_2$— OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R$^N$)—, (R$^C$)$_2$NC(O)—, halogen, and —H.

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or R and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as R$^S$. An R$^S$ substituted version of a chemical group defined using the "$(C_x-C_y)$" parenthetical may contain more than y carbon atoms depending on the identity of any groups R$^S$. For example, a "$(C_1-C_{40})$alkyl substituted with exactly one group R$^S$, where R$^S$ is phenyl (—C$_6$H$_5$)" may contain from 7 to 46 carbon atoms. Thus, in general when a chemical group defined using the "$(C_x-C_y)$" parenthetical is substituted by one or more carbon atom-containing substituents R$^S$, the minimum and maximum total number of carbon atoms of the chemical group is determined by adding to both x and y the combined sum of the number of carbon atoms from all of the carbon atom-containing substituents R$^S$.

In some embodiments, each of the chemical groups (e.g., X, R, etc.) of the metal-ligand complex of Formula (I) may be unsubstituted having no R$^S$ substituents. In other embodiments, at least one of the chemical groups of the metal-ligand complex of Formula (I) may independently contain one or more than one R$^S$. In some embodiments, the sum total of R$^S$ in the chemical groups of the metal-ligand complex of Formula (I) does not exceed 20. In other embodiments, the sum total of R$^S$ in the chemical groups does not exceed 10. For example, if each R$^{15}$ was substituted with two R$^S$, then X and Z cannot be substituted with an R$^S$. In another embodiment, the sum total of R$^S$ in the chemical groups of the metal-ligand complex of Formula (I) may not exceed 5 R$^S$. When two or more than two R$^S$ are bonded to a same chemical group of the metal-ligand complex of Formula (I), each R$^S$ is independently bonded to the same or different carbon atom or heteroatom and may include persubstitution of the chemical group.

The term "substitution" means that at least one hydrogen atom (—H) bonded to a carbon atom or heteroatom of a corresponding unsubstituted compound or functional group is replaced by a substituent (e.g. R$^S$). The term "persubstitution" means that every hydrogen atom (H) bonded to a carbon atom or heteroatom of a corresponding unsubstituted compound or functional group is replaced by a substituent (e.g., R$^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable and unless clearly specified, mean the same thing.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more R$^S$.

In this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$hydrocarbyl) and other embodiments, a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, which is unsubstituted or substituted by one or more R$^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and [C$_{45}$]alkyl. The term "[C$_{45}$]alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., —CH$_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. —CH$_2$CH$_2$), propan-1,3-diyl (i.e. —CH$_2$CH$_2$CH$_2$—), 2-methylpropan-1,3-diyl (i.e. —CH$_2$CH(CH$_3$)CH$_2$—). Some examples of $(C_6-C_{40})$ arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{40})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted $(C_1-C_{40})$alkylene are substituted $(C_1-C_{20})$alkylene, —CF$_2$—, —C(O)—, and —(CH$_2$)$_{14}$C(CH$_3$)$_2$(CH$_2$)— (i.e., a 6,6-dimethyl substituted normal-1,20-eicosylene). Since as mentioned previously two $R^S$ may be taken together to form a $(C_1-C_1)$alkylene, examples of substituted $(C_1-C_{40})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2] octane.

The term "$(C_3-C_4)$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of groups containing one or more than one heteroatom include O, S, S(O), S(O)$_2$, Si(R$^C$)$_2$, P(R$^P$), N(R$^N$), —N=C(R$^C$)$_2$, —Ge(R$^C$)$_2$—, or —Si(R$^C$)—, where each R$^C$ and each R$^P$ is unsubstituted $(C_1-C_{18})$hydrocarbyl or —H, and where each R$^N$ is unsubstituted $(C_1-C_{18})$hydrocarbyl. The term "heterohydrocarbon" refers to a molecule or molecular framework in which one or more carbon atoms are replaced with a heteroatom. The term "$(C_1-C_{40})$heterohydrocarbyl" means a heterohydrocarbon radical of from 1 to 40 carbon atoms, and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{40})$ heterohydrocarbyl and $(C_1-C_{40})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{40})$heterohydrocarbyl may be unsubstituted or substituted. Non-limiting examples of the $(C_1-C_{40})$heterohydrocarbyl include $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si(R$^C$)$_2$—, $(C_1-C_{40})$hydrocarbyl-N(R$^N$)—, $(C_1-C_{40})$hydrocarbyl-P(R$^P$)—, $(C_2-C_{40})$heterocycloalkyl, $(C_2-C_{19})$ heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$ heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_1-C_{40})$heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x-C_y)$heteroaryl generally, such as $(C_1-C_{12})$heteroaryl) are defined in an analogous manner as having from x to y carbon atoms (such as 1 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6, 5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1-C_{40})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

In some embodiments the catalyst systems comprising a metal-ligand complex of Formula (I) may be rendered catalytically active by any technique known in the art for activating metal-based catalysts of olefin polymerization reactions. For example, comprising a metal-ligand complex of Formula (I) may be rendered catalytically active by contacting the complex to, or combining the complex with, an activating cocatalyst. Suitable activating cocatalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating cocatalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (cocatalysts) include Group 13 metal compounds containing from 1 to 3 $(C_1-C_{20})$hydrocarbyl substituents as described herein. In one embodiment, Group 13 metal compounds are tri$((C_1-C_{20})$hydrocarbyl)-substituted-aluminum or tri$((C_1-C_{20})$hydrocarbyl)-boron compounds. In other embodiments, Group 13 metal compounds are tri(hydrocarbyl)-substituted-aluminum, tri(hydrocarbyl)-boron compounds, tri$((C_1-C_{10})$alkyl)aluminum, tri$((C_6-C_{18})$aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating cocatalyst is a tetrakis$((C_1-C_{20})$hydrocarbyl borate (e.g. trityl tetrafluoroborate) or a tri$((C_1-C_{20})$hydrocarbyl)ammonium tetra$((C_1-C_{20})$hydrocarbyl)borane (e.g. bis(octadecyl)methylammonium tetrakis(pentafluorophenyl)borane). As used herein, the term "ammonium" means a nitrogen cation that is a $((C_1-C_{20})$hydrocarbyl$)_4N^+$ a $((C_1-C_{20})$hydrocarbyl$)_3N(H)^+$, a $((C_1-C_{20})$hydrocarbyl$)_2N(H)_2^+$, $(C_1-C_{20})$hydrocarbylN$(H)_3^+$, or $N(H)_4^+$, wherein each $(C_1-C_{20})$hydrocarbyl, when two or more are present, may be the same or different.

Combinations of neutral Lewis acid activators (cocatalysts) include mixtures comprising a combination of a tri$((C_1-C_{40})$alkyl)aluminum and a halogenated tri$((C_6-C_{18})$aryl)boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system comprising the metal-ligand complex of Formula (I) may be activated to form an active catalyst composition by combination with one or more cocatalysts, for example, a cation forming cocatalyst, a strong Lewis acid, or combinations thereof. Suitable activating cocatalysts include polymeric or oligomeric aluminoxanes, especially methyl aluminoxane, as well as inert, compatible, noncoordinating, ion forming compounds. Exemplary suitable cocatalysts include, but are not limited to: modified methyl aluminoxane (MMAO), bis(hydrogenated tallow alkyl)methyl tetrakis(pentafluorophenyl)borate(1-) amine, and combinations thereof.

In some embodiments, one or more of the foregoing activating cocatalysts are used in combination with each other. An especially preferred combination is a mixture of a tri$((C_1-C_{40})$hydrocarbyl)aluminum, tri$((C_1-C_{40})$hydrocarbyl)borane, or an ammonium borate with an oligomeric or polymeric alumoxane compound. The ratio of total number of moles of one or more metal-ligand complexes of Formula (I) to total number of moles of one or more of the activating cocatalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating cocatalyst, preferably the number of moles of the alumoxane that are employed is at least 100 times the number of moles of the metal-ligand complex of Formula (I). When tris(pentafluorophenyl)borane alone is used as the activating cocatalyst, in some other embodiments, the number of moles of the tris(pentafluorophenyl)borane that are employed to the total number of moles of one or more metal-ligand complexes of Formula (I) from 0.5:1 to 10:1, from 1:1 to 6:1, or from 1:1 to 5:1. The remaining activating cocatalysts are generally employed in approximately mole quantities equal to the total mole quantities of one or more metal-ligand complexes of Formula (I).

Various solvents are contemplated, for example, aromatic and paraffin solvents. Exemplary solvents include, but are not limited to, isoparaffins. For example, such isoparaffin solvents are commercially available under the name ISOPAR E from ExxonMobil Chemical.

The reactivity ratios are determined by the resulting difference in polymerization rates (i.e., selectivity) between ethylene and the $C_3$-$C_{12}$ α-olefin with the polymerization catalyst in the polymerization process. It is believed that steric interactions for the polymerization catalysts result in polymerization of ethylene more selectively than α-olefins such as $C_3$-$C_{12}$ α-olefins (i.e., the catalyst preferentially polymerizes ethylene in the presence of the α-olefin). Again without being bound by theory, it is believed that such steric interactions cause the catalyst, for example, the homogenous catalyst prepared with or from the metal-ligand complex of Formula (I) to adopt a conformation that allows ethylene to access the M substantially more easily, or adopt a reactive conformation more readily, or both than the catalyst allows the α-olefin to do so.

For random copolymers in which the identity of the last monomer inserted dictates the rate at which subsequent monomers insert, the terminal copolymerization model is employed. In this model insertion reactions of the type $$\cdots M_iC^* + M_j \xrightarrow{k_{ij}} \cdots M_iM_jC^* \quad \text{(Equation 1)}$$

where C* represents the catalyst, $M_i$ represents monomer i, and $k_{ij}$ is the rate constant having the rate equation $$R_{P_{ij}} = k_{ij}[\ldots M_iC^*][M_j] \quad \text{(Equation 2)}$$

The comonomer mole fraction (i=2) in the reaction media is defined by the equation:

$$f_2 = \frac{[M_2]}{[M_1] + [M_2]} \quad \text{(Equation 3)}$$

A simplified equation for comonomer composition can be derived as disclosed in George Odian, *Principles of Polymerization*, Second Edition, John Wiley and Sons, 1970, as follows:

$$F_1 = 1 - F_2 = \frac{r_1(1-f_2)^2 + (1-f_2)f_2}{r_1(1-f_2)^2 + 2(1-f_2)f_2 + r_2f_2^2}$$

From this equation the mole fraction of comonomer in the polymer is solely dependent on the mole fraction of comonomer in the reaction media and two temperature dependent reactivity ratios defined in terms of the insertion rate constants as:

$$r_1 = \frac{k_{11}}{k_{12}} \quad r_2 = \frac{k_{22}}{k_{21}} \quad \text{(Equation 5)}$$

For this model as well the polymer composition is a function only of temperature dependent reactivity ratios and comonomer mole fraction in the reactor. The same is also true when reverse comonomer or monomer insertion may occur or in the case of the interpolymerization of more than two monomers.

Reactivity ratios for use in the foregoing models may be predicted using well known theoretical techniques or empirically derived from actual polymerization data. Suitable theoretical techniques are disclosed, for example, in B. G. Kyle, *Chemical and Process Thermodynamics*, Third Addition, Prentice-Hall, 1999 and in Redlich-Kwong-Soave (RKS) Equation of State, *Chemical Engineering Science*, 1972, pp 1197-1203. Commercially available software programs may be used to assist in deriving reactivity ratios from experimentally derived data. One example of such software is Aspen Plus from Aspen Technology, Inc., Ten Canal Park, Cambridge, Mass. 02141-2201 USA.

As stated above, the present composition embodiments comprising the multimodal ethylene-based polymers with an optional LDPE may be incorporated into films. The films may be monolayer or multilayer films produced by blown film or cast film processes. The films can be incorporated into a variety of articles including, for example, food packages, industrial and consumer packaging materials, construction films, foamed films, and others.

Optionally, the films may further comprise one or more additives. Additives include, but are not limited to, antistatic agents, color enhancers, dyes, lubricants, fillers (for example, $TiO_2$ or $CaCO_3$), opacifiers, nucleators, processing aids, pigments, primary anti-oxidants, secondary anti-oxidants, UV stabilizers, anti-block agents, slip agents, tackifiers, fire retardants, anti-microbial agents, odor reducer agents, anti-fungal agents, and combinations thereof.

In some embodiments, the film is a blown monolayer film having improved toughness, for example, as demonstrated by improved dart strength and secant modulus.

Testing Methods

The testing methods include the following:

Melt Index ($I_2$) and ($I_{10}$)

Melt index ($I_2$) values for the multimodal ethylene-based polymers measured in accordance to ASTM D1238 at 190° C. at 2.16 kg. Similarly, melt index (ho) values for the multimodal ethylene-based polymers were measured in accordance to ASTM D1238 at 190° C. at 10 kg. The values are reported in g/10 min, which corresponds to grams eluted per 10 minutes. The melt index ($I_2$) values for the first ethylene-based component, the second ethylene-based component, and the third ethylene-based component were calculated according to Equation 30 and the methodology described below.

Density

Density measurements for the multimodal ethylene-based polymers were made in accordance with ASTM D792, Method B. For the first and second ethylene-based components, the density values were obtained using Equations 28 and the methodology described below. For the third ethylene-based component, the density value was calculated using Equation 29.

Conventional Gel Permeation Chromatography (Conventional GPC)

The chromatographic system consisted of a PolymerChar GPC-IR (Valencia, Spain) high temperature GPC chromatograph equipped with an internal IR5 infra-red detector (IR5). The autosampler oven compartment was set at 160° C. and the column compartment was set at 150° C. The columns used were 4 Agilent "Mixed A" 30 cm 20-micron linear mixed-bed. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80° C. with gentle agitation for 30 minutes. The polystyrene standard peak molecular weights were converted to ethylene-based polymer molecular weights using Equation 6 (as described in Williams and Ward, J. Polym. Sci., Polym. Let., 6, 621 (1968)):

$$M_{polyethylene} = A \times (M_{polystyrene})^B \quad \text{(Equation 6)}$$

where M is the molecular weight, A has a value of 0.4315 and B is equal to 1.0.

A fifth order polynomial was used to fit the respective ethylene-based polymer-equivalent calibration points. A small adjustment to A (from approximately 0.39 to 0.44) was made to correct for column resolution and band-broadening effects such that NIST standard NBS 1475 is obtained at a molecular weight of 52,000 g/mol.

The total plate count of the GPC column set was performed with Eicosane (prepared at 0.04 g in 50 milliliters of TCB and dissolved for 20 minutes with gentle agitation). The plate count (Equation 7) and symmetry (Equation 8) were measured on a 200 microliter injection according to the following equations:

$$\text{Plate Count} = 5.54 \times \left( \frac{RV_{Peak\ Max}}{\text{Peak Width at half height}} \right)^2 \quad \text{(Equation 7)}$$

where RV is the retention volume in milliliters, the peak width is in milliliters, the peak max is the maximum height of the peak, and half height is one half of the height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(Equation 8)}$$

where RV is the retention volume in milliliters and the peak width is in milliliters, Peak max is the maximum position of the peak, one tenth height is one tenth of the height of the peak maximum, and where rear peak refers to the peak tail at later retention volumes than the peak max and where front peak refers to the peak front at earlier retention volumes than the peak max. The plate count for the chromatographic system should be greater than 22,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 3 hours at 160° C. under "low speed" shaking.

The calculations of $M_{n(GPC)}$, $M_{w(GPC)}$, and $M_{z(GPC)}$ were based on GPC results using the internal IR5 detector (measurement channel) of the PolymerChar GPC-IR chromatograph according to Equations 9-12, using PolymerChar GPCOne™ software, the baseline-subtracted IR chromatogram at each equally-spaced data collection point i ($IR_i$) and the ethylene-based polymer equivalent molecular weight obtained from the narrow standard calibration curve for the point i ($M_{polyethylene,i}$ in g/mol) from Equation 6. Subsequently, a GPC molecular weight distribution (GPC-MWD) plot ($wt_{GPC}(lgMW)$ vs. lgMW plot, where $wt_{GPC}(lgMW)$ is the weight fraction of ethylene-based polymer molecules with a molecular weight of lgMW) for the ethylene-based polymer sample can be obtained. Molecular weight is in g/mol and $wt_{GPC}(lgMW)$ follows the Equation 9.

$$\int wt_{GPC}(lgMW) \, dlgMW = 1.00 \quad \text{(Equation 9)}$$

Number-average molecular weight $M_{n(GPC)}$, weight-average molecular weight $M_{w(GPC)}$ and z-average molecular weight $M_{z(GPC)}$ can be calculated as the following equations.

$$Mn_{(GPC)} = \frac{\sum_i IR_i}{\sum_i \left( \frac{IR_i}{M_{polyethylene,i}} \right)} \quad \text{(Equation 10)}$$

$$Mw_{(GPC)} = \frac{\sum_i (IR_i * M_{polyethylene,i})}{\sum_i IR_i} \quad \text{(Equation 11)}$$

$$Mz_{(GPC)} = \frac{\sum_i (IR_i * M_{polyethylene,i}^2)}{\sum_i (IR_i * M_{polyethylene,i})} \quad \text{(Equation 12)}$$

In order to monitor the deviations over time, a flow rate marker (decane) was introduced into each sample via a micropump controlled with the PolymerChar GPC-IR system. This flow rate marker (FM) was used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 13. Processing of the flow marker peak was done via the PolymerChar GPCOne™ Software. Acceptable flow rate correction is such that the effective flowrate should be within 0.5% of the nominal flowrate.

$$\text{Flow rate}_{effective} = \text{Flow rate}_{nominal} \times (RV(FM_{calibrated}) / RV(FM_{sample})) \quad \text{(Equation 13)}$$

IR5 GPC Comonomer Content (GPC-CC) Plot

A calibration for the IR5 detector ratioing was performed using at least ten ethylene-based polymer standards (ethylene-based polymer homopolymer and ethylene/octene copolymers) of known short chain branching (SCB) frequency (The comonomer content of the reference materials is determined using 13C NMR analysis in accordance with techniques described, for example, in U.S. Pat. No. 5,292,845 (Kawasaki, et al.) and by J. C. Randall in Rev. Macromol. Chem. Phys., C29, 201-317, which are incorporated herein by reference), ranging from homopolymer (0 SCB/1000 total C) to approximately 50 SCB/1000 total C, where total C is equal to the carbons in backbone plus the carbons in branches. Each standard had a weight-average molecular weight from 36,000 g/mole to 126,000 g/mole and had a molecular weight distribution from 2.0 to 2.5, as determined by GPC. Typical Copolymer Standards properties and measurements are shown in Table A.

TABLE A

"Copolymer" Standards

| Wt % Comonomer | IR5 Area ratio | SCB/1000 Total C | $M_{w(GPC)}$ g/mol | $M_{w(GPC)}/M_{n(GPC)}$ |
|---|---|---|---|---|
| 0.0 | 0.1809 | 0.0 | 38,400 | 2.20 |
| 1.1 | 0.1810 | 1.4 | 107,000 | 2.09 |
| 5.4 | 0.1959 | 6.8 | 37,400 | 2.16 |
| 8.6 | 0.2043 | 10.8 | 36,800 | 2.20 |
| 9.4 | 0.2031 | 11.8 | 103,200 | 2.26 |
| 14.0 | 0.2152 | 17.5 | 36,000 | 2.19 |
| 14.3 | 0.2161 | 17.9 | 103,600 | 2.20 |
| 23.1 | 0.2411 | 28.9 | 37,300 | 2.22 |
| 35.9 | 0.2708 | 44.9 | 42,200 | 2.18 |
| 39.2 | 0.2770 | 49.0 | 125,600 | 2.22 |

The "IR5 Area Ratio (or "IR5$_{Methyl\ Channel\ Area}$/IR5$_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "Copolymer" standards. A linear fit of the Wt % Comonomer versus the "IR5 Area Ratio" was constructed in the form of the following Equation 14:

$$\text{wt \% Comonomer} = A_0 + [A_1 (IR5_{Methyl\ Channel\ Area}/IR5_{Measurement\ Channel\ Area})] \quad \text{(Equation 14)}$$

Therefore, a GPC-CC (GPC-Comonomer Content) plot (wt % comonomer vs. lgMW) can be obtained. End-Group Correction of the wt % Comonomer data can be made via knowledge of the termination mechanism if there is significant spectral overlap with the comonomer termination (methyls) via the molecular weight determined at each chromatographic slice.

Crystallization Elution Fractionation (CEF)

Comonomer distribution analysis, also commonly called short chain branching distribution (SCBD), is measured with Crystallization Elution Fractionation (CEF) (PolymerChar, Spain) (Monrabal et al, Macromol. Symp. 257, 71-79 (2007), which is incorporated herein by reference) equipped with an IR (IR-4 or IR-5) detector (PolymerChar, Spain) and 2-angle light scattering detector Model 2040 (Precision Detectors, currently Agilent Technologies). Distilled anhydrous ortho-dichlorobenzene (ODCB) with 600 ppm antioxidant butylated hydroxytoluene (BHT) was used as solvent. For the autosampler with the capability of $N_2$ purge, no BHT was added. A GPC guard column (20 microns, or 10 microns, 50×7.5 mm) (Agilent Technologies) is installed just before the IR detector in the detector oven. Sample preparation is done with an autosampler at 160° C. for 2 hours under shaking at 4 mg/ml (unless otherwise specified). The injection volume is 300 μl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization was at 0.052 ml/min. The flow rate during elution is at 0.50 ml/min. The data was collected at one data point/second.

The CEF column is packed by The Dow Chemical Company with glass beads at 125 μm±6% (MO-SCI Specialty Products) with ⅛-inch stainless tubing. Glass beads are acid washed by MO-SCI Specialty by request from The Dow Chemical Company. Column volume is 2.06 ml. Column temperature calibration was performed by using a mixture of NIST Standard Reference Material Linear ethylene-based polymer 1475a (1.0 mg/ml) and Eicosane (2 mg/ml) in ODCB. Temperature was calibrated by adjusting elution heating rate so that NIST linear ethylene-based polymer 1475a has a peak temperature at 101.0° C., and Eicosane has a peak temperature of 30.0° C. The CEF column resolution was calculated with a mixture of NIST linear ethylene-based polymer 1475a (1.0 mg/ml) and hexacontane (Fluka, purum≥97.0%, 1 mg/ml). A baseline separation of hexacontane and NIST ethylene-based polymer 1475a was achieved. The area of hexacontane (from 35.0 to 67.0° C.) to the area of NIST 1475a from 67.0 to 110.0° C. is 50 to 50, the amount of soluble fraction below 35.0° C. is less than 1.8 wt %. The CEF column resolution is defined in Equation 15:

$$\text{Resolution} = \frac{\text{Peak Temperature}_{NIST1475A} - \text{Peak Temperature}_{Hexacontane}}{\text{Width at Half Height}_{NIST1475A} + \text{Width at Half Height}_{Hexacontane}} \geq 6.0 \quad \text{(Equation 15)}$$

where the half height width is measured in temperature and resolution is at least 6.0.

The CEF instrument was equipped with an Agilent (Santa Clara, Calif.) Model 2040 2-angle light scattering detector, and the light scattering was calibrated using the 90 degree signal channel with a known homopolymer ethylene-based polymer standard of known molecular weight (approximately 120,000 g/mol). The IR (infrared) detector was also calibrated for mass response. Molecular weight ($M_{w(CEF)}$) at each elution point was calculated as a function of elution temperature in regions of adequate signal to noise. Area calculations (representing the total area of the 90 degree light scattering signal divided by the respective IR area and factored by the respective detector constants) was used to evaluate the weight-average molecular weight across regions of the elution temperature and to obtain a CEF-MW plot ($M_{w(CEF)}$ vs. temperature curve). The area calculations have an inherent advantage of signal to noise over the continuous calculations. Both the IR and LS (light scattering) signals were subtracted from their baseline signal levels in accordance with normal chromatographic integration techniques.

A calculation of the "Critical Temperature ($T_{critical}$)," the weight fraction of polymer and the weight-average molecular weight in the temperature range of up to and including the critical temperature ($M_{w(CEF)}$ of CEF fraction between 20° C. and $T_{critical}$) were obtained as follows:

Obtain a CEF-SCBD (CEF-short chain branching distribution) plot using weight fraction ($wt_{CEF}(T)$) at each temperature (T) from 20.0° C. to 119.9° C. with a temperature step increase of 0.2° C., where $$\int_{20.0}^{119.9} wt_{CEF}(T) dT = 1.00 \quad \text{(Equation 16)}$$

Critical temperature is defined by the density of the resin (in g/cc) according to $$T_{critical}(°C.) = 1108.1(°C.\cdot cc/g) \times \text{density (g/cc)} - 952.1(°C.) \quad \text{(Equation 17)}$$

CEF weight fraction between 20° C. to $T_{critical}$ is calculated from CEF-SCBD as $$\int_{20.0}^{T_{critical}} wt_{CEF}(T) dT \quad \text{(Equation 18)}$$

Similarly, the weight-average molecular weight of the fraction from 20° C. up to and including the critical temperature ($M_{w(CEF)}$ of CEF fraction between 20° C. and $T_{critical}$) was calculated as the area ratio of the sum of the 90 degree light scattering responses divided by the sum of the IR detector responses between 20° C. to $T_{critical}$ and factored for the calibrated detector constants. The molecular weight calculations and calibrations were performed in GPCOne® software.

Numerical Deconvolution of Bivariate Data

Numerical Deconvolution of Bivariate Data is used to obtain the density, molecular weight, and melt index ($I_2$) of the first ethylene-based component, the second ethylene-based component, and the third ethylene-based component. Numerical deconvolution of the combined CEF-SCBD ($wt_{CEF}(T)$ vs. temperature (T) plot from CEF) and GPC-MWD ($wt_{GPC}(\lg MW)$) vs. lgMW plot from conventional GPC) data was performed using Microsoft Excel® Solver (2013). For CEF-SCBD, the calculated weight fraction ($wt_{sum,CEF}(T)$) versus temperature (T) data obtained using the method described in the CEF section (in the range of approximately 23 to 120° C.) was quelled to approximately 200 equally-spaced data points in order for a balance of appropriate iterative speed and temperature resolution. A single or series (up to 3 peaks for each component) of Exponentially-Modified Gaussian Distributions (Equation 19) were summed to represent each component ($wt_{C,CEF}(T)$), and the components were summed to yield the total weight ($wt_{sum,CEF}(T)$) at any temperature (T) as shown in Equations 20A-D.

$$y_{T,C,P} = \frac{a_{0,C,P}}{2a_{3,C,P}} \quad \text{(Equation 19)}$$

$$e^{\left(\frac{a_{2,C,P}^2}{2a_{3,C,P}^2} + \frac{a_{1,C,P}-T}{a_{3,C,P}}\right)} \left[\frac{1}{2} + \frac{1}{2}\text{erf}\left(\frac{T-a_{1,C,P}}{\sqrt{2}\,a_{2,CP}} - \frac{a_{2,C,P}}{\sqrt{2}\,a_{3,C,P}}\right)\right]$$

where C means component (C=1, 2 or 3), P means peak (P=1, 2, or 3), $a_{0,C,P}$ is the chromatographic area in ° C. for the P-th peak of the C-th component, $a_{1,C,P}$ is the peak center in ° C. for the P-th peak of the C-th component, $a_{2,C,P}$ is the peak width in ° C. for the P-th peak of the C-th component, $a_{3,C,P}$ is the peak tailing in ° C. for the P-th peak of the C-th component, and T is the elution temperature in ° C. In the case of a single Exponentially-Modified Gaussian Distributions is used to represent the CEF-SCBD of a component, $y_{T,C,2} = y_{T,C,3} = 0$. In the case of two Exponentially-Modified Gaussian Distributions are used to represent the CEF-SCBD of a component, only $y_{T,C,3} = 0$.

$$wt_{C1,CEF}(T) = \Sigma_{p=1}^3 y_{T,1,P} \quad \text{(Equation 20A)}$$

$$wt_{C2,CEF}(T) = \Sigma_{p=1}^3 y_{T,2,P} \quad \text{(Equation 201B)}$$

$$wt_{C3,CEF}(T) = \Sigma_{p=1}^3 y_{T,3,P} \quad \text{(Equation 20C)}$$

$$wt_{sum,CEF}(T) = wt_{C1,CEF}(T) + wt_{C2,CEF}(T) + wt_{C3,CEF}(T) \quad \text{(Equation 20D)}$$

Weight fraction of each component ($wf_{C,CEF}$) from CEF-SCBD deconvolution can be expressed by $$wf_{C1,CEF} = \int wt_{C1}(T) dT \quad \text{(Equation 21A)}$$

$$wf_{C2,CEF} = \int wt_{C2}(T) dT \quad \text{(Equation 21B)}$$

$$wf_{C3,CEF} = \int wt_{C3}(T) dT \quad \text{(Equation 21C)}$$

$$wf_{sum,CEF}(T) dT = 1.00 \quad \text{(Equation 21D)}$$

where $wf_{C1,CEF}$ is the weight fraction of the first ethylene-based component obtained from CEF-SCBD deconvolution, $wf_{C2,CEF}$ is the weight fraction of the second ethylene-based component obtained from CEF-SCBD deconvolution, $wf_{C3,CEF}$ is the weight fraction of the third ethylene-based component obtained from CEF-SCBD deconvolution, and the sum of the fractions is normalized to 1.00.

For GPC-MWD, the MWD obtained by the Conventional GPC description section was imported into the same spreadsheet in 0.01 lg(MW/(g/mol)) increments between 2.00 and 7.00 (501 data points total). A Flory-Schulz Distribution with a weight-average molecular weight of $M_{w,Target}$ and a polydispersity ($M_w/M_n$) of 2.0 is shown in the following equations.

$$wt_{F-S,i} = \left(\frac{3.03485 \times M_i}{M_{w,Target}}\right)^2 \times e^{\left(\frac{-2M_i}{M_{w,Target}}\right)} \quad \text{(Equation 22)}$$

$$\sum_{i=0}^{499} wt_{F-S,i} \times (\lg(M_{i+1}/(g/\text{mol})) - \lg(M_i/(g/\text{mol}))) = 1.00 \quad \text{(Equation 23)}$$

$$\lg(M_{i+1}/(g/\text{mol})) - \lg(M_i/(g/\text{mol})) = 0.01 \quad \text{(Equation 24)}$$

where $wt_{F-S,i}$ is the weigh fraction of the molecules at $\lg(M_i/(g/\text{mol}))$ ($M_i$ in g/mol), i is integers ranging from 0 to 500 to represent each data point on the GPC-MWD plot and corresponding $\lg(M_i/(g/\text{mol}))$ is $2 + 0.01 \times i$.

The Flory-Schulz Distribution is subsequently broadened using a sum of a series normal distribution at each $\lg(M_i/(g/\text{mol}))$. The weight fraction of the Normal Distribution with its peak value at $\lg(M_i/(g/\text{mol}))$ is kept the same as the original Flory-Schulz Distribution. The broadened Flory-Schulz Distribution curve can be described as the following equation.

$$wt_{GPC}(\lg(M_i/(g/\text{mol}))) = \sum_{j=0}^{500} \frac{wt_{F-S,j}}{\sqrt{2\pi}\,\sigma} e^{-\frac{(\lg(M_i/(g/mol))-(2+0.01 \times j))^2}{2\sigma^2}} \quad \text{(Equation 25)}$$

where $wt_{GPC}(\lg(M_i/(g/\text{mol})))$ is the weight fraction of the molecules at $\lg(M_i/(g/\text{mol}))$, j is integers ranging from 0 to 500, a is the standard deviation of the Normal Distribution. Therefore, molecular weight distribution curves for all three components can be expressed as the following equations. Number-average molecular weight ($M_{n(GPC)}$), weight-average molecular weight ($M_{w(GPC)}$), and MWD ($M_{w(GPC)}/M_{n(GPC)}$) can be calculated from the broadened Flory-Schulz Distribution.

$$wt_{C1,GPC}(lg(M_i/(g/mol))) = \qquad \text{(Equation 26A)}$$

$$wf_{C1,GPC} \times \sum_{j=0}^{500} \frac{wt_{F-S,C1,j}}{\sqrt{2\pi}\,\sigma_{C1}} e^{\frac{(lg(M_i/(g/mol))-(2+0.01\times j))^2}{2\sigma_{C1}^2}}$$

$$wt_{C2,GPC}(lg(M_i/(g/mol))) = \qquad \text{(Equation 26B)}$$

$$wf_{C2,GPC} \times \sum_{j=0}^{500} \frac{wt_{F-S,C2,j}}{\sqrt{2\pi}\,\sigma_{C2}} e^{\frac{(lg(M_i/(g/mol))-(2+0.01\times j))^2}{2\sigma_{C2}^2}}$$

$$wt_{C3,GPC}(lg(M_i/(g/mol))) = \qquad \text{(Equation 26C)}$$

$$wf_{C3,GPC} \times \sum_{j=0}^{500} \frac{wt_{F-S,C3,j}}{\sqrt{2\pi}\,\sigma_{C3}} e^{\frac{(lg(M_i/(g/mol))-(2+0.01\times j))^2}{2\sigma_{C3}^2}}$$

$$wt_{sum,GPC}(lg(M_i/(g/mol))) = wt_{C1,GPC}(lg(M_i/(g/mol))) + \qquad \text{(Equation 26D)}$$
$$wt_{C2,GPC}(lg(M_i/(g/mol))) + wt_{C3,GPC}(lg(M_i/(g/mol)))$$

where $\sigma$ is the normal distribution width parameter, the subscripts C1, C2 and C3 represent the first, the second and the third ethylene-based components, respectively. $wf_{C1,GPC}$, $wf_{C2,GPC}$ and $wf_{C3,GPC}$ are the weight fractions of the first, the second and the third ethylene-based components from GPC-MWD, respectively.

Each of the paired components (the first ethylene-based component (C1), the second ethylene-based component (C2), and third ethylene-based component (C3)) from CEF-SCBD and GPC-MWD are considered equivalent masses for their respective techniques as shown in Equations 27A-E.

$$wf_{C1,CEF} + wf_{C2,CEF} + wf_{C3,CEF} = 1.00 \qquad \text{(Equation 27A)}$$

$$wf_{C1,GPC} + wf_{C2,GPC} + wf_{C3,GPC} = 1.00 \qquad \text{(Equation 27B)}$$

$$wf_{C1,CEF} = wf_{C1,GPC} \qquad \text{(Equation 27C)}$$

$$wf_{C2,CEF} = wf_{C2,GPC} \qquad \text{(Equation 27D)}$$

$$wf_{C2,CEF} = wf_{C2,GPC} \qquad \text{(Equation 27E)}$$

Figure 3:
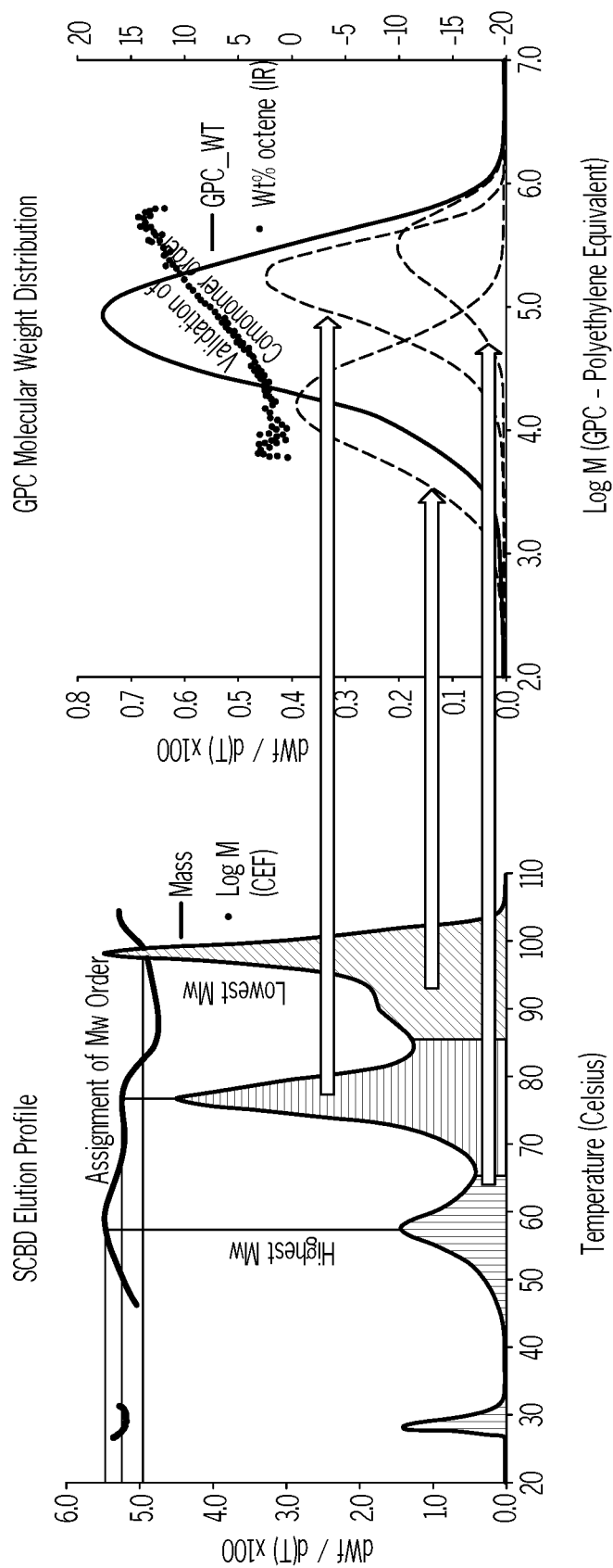
FIG. 3 depicts side-by-side Short Chain Branching Distribution (SCBD) Elution Profiles and Molecular Weight Distribution (MWD) plots of Comparative Polymer 7, which are used for estimating the initial parameters for the numerical deconvolution process described below.

Process and catalyst data, including catalysts efficiency and reactor mass balance, can be leveraged for initial estimates of the relative weight production of each component. Alternatively, initial estimates of the weight fraction for each component can be compared by integrating partial areas of the CEF-SCBD or GPC-MWD plot of the multi-modal ethylene-based polymer, especially noting visible areas with defined peaks or peak inflection points. For example, the peak area for each component in CEF-SCBD curve (Comparative Polymer 7), if well-separated may be estimated by dropping vertical lines between peaks as shown in FIG. 3. Association of the molecular weight order and initial estimation of the molecular weight may be obtained from the peak positions of the associated component areas in the CEF-SCBD and CEF-MW plots and agreement should be expected with the GPC-CC measurements as shown in FIG. 3. In some cases, initial assignment of peak areas and composition may be obtained from a multi-modal GPC-MWD as the starting point and validated under the CEF-SCBD and CEF-MW plots.

Initial estimates of the peak width and tailing in CEF-SCBD for each component can be obtained from a calibration of peak width vs. temperature using a series of standard single-site samples such as those previously presented in Table A.

Microsoft Excel® Solver is programmed to minimize the combined sum of squares of residuals between the $wt_{sum,GPC}(lgM_i)$ and the measured GPC-MWD, and sum of squares of residuals between the $wt_{sum,CEF}(T)$ and the measured CEF-SCBD (wherein the sampling width and areas of the two observed distributions are normalized in regards to each other). There is equal weighting given to the GPC-MWD and CEF-SCBD fit as they are simultaneously converged. Initial estimated values for weight fraction and peak width in CEF-SCBD as well as molecular weight target for each component are used for the Microsoft Excel® Solver to begin with as described herein.

Co-crystallization effects which distort peak shape in CEF are compensated for by the use of the Exponentially-Modified Gaussian (EMG) peak fit and in extreme cases, the use of multiple (up to 3) EMG peaks summed to describe a single component. A component produced via a single site catalyst may be modeled by a single EMG peak. A component produced via a Ziegler-Natta catalyst may be modeled by 1, 2, or 3 EMG peaks, or a single EMG peak possessing a long low temperature-facing tail sufficing for a Ziegler-Natta component of very high density, very low molecular weight targets on the CEF-SCBD plot. In all cases, only a single broadened Flory-Schulz distribution (Equation 26A-C) is used with the weight fraction assigned as the associated sum of one or more of the EMG components from the CEF-SCBD model (Equations 27A-E).

The GPC deconvolution is constrained with a normal distribution width parameter ($\sigma_{C1}$ or $\sigma_{C2}$) from Equation 26A, 26B between 0.000 and 0.170 (corresponding polydispersities of approximately 2.00 to 2.33) for the first and second ethylene-based components which are made via single site catalysts. The $M_{w,Target}$ in Equation 22 is constrained to be lowest for the third ethylene-ethylene based component in these cases, since it is targeted to be the lowest from this specific reaction scheme. Note that it is not constrained by definition to be lowest in all possible cases, depending upon the desired performance target of the combined resin in-reactor blend. The ranking (preliminary estimation) of the two weight-average molecular weights ($M_{w,Target}$) of the first ethylene-based component and the second ethylene-based component is observed by the $M_{w(CEF)}$ from the CEF-MW plot ($M_{w(CEF)}$ vs. temperature curve) at the temperatures at which the first and second ethylene-based component peaks are observed on the CEF-SCBD plot ($wt_{CEF}(T)$ vs. temperature curve). Therefore, the order of the molecular weights for the three components is well-known. A reactor mass balance yields the percentage mass (Wf) of Equation 26C of the third ethylene-based component, or alternatively it can be calculated from the deconvolution using Equation 26D, depending upon the strength of the known distribution models for CEF and GPC and the total weight fraction must sum to unity (Equations 27A-E).

Figure 4:
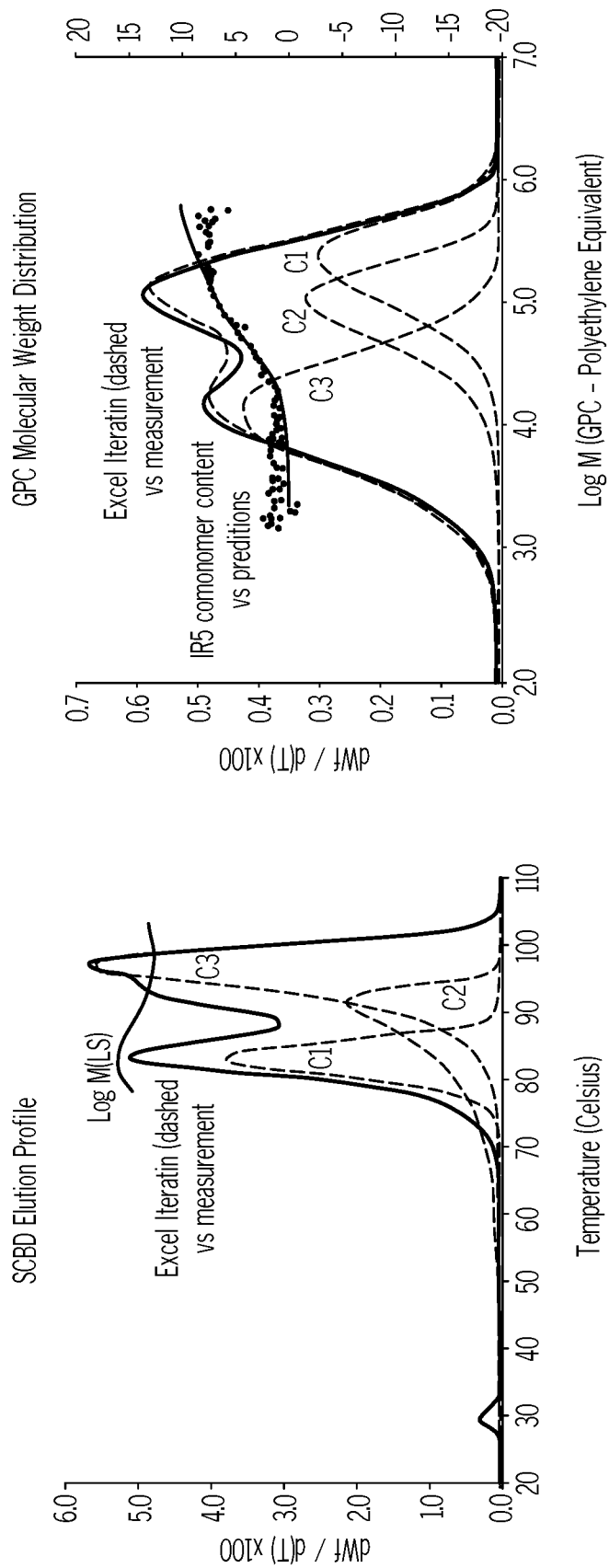
FIG. 4 shows a combined iteration of Short Chain Branching Distribution (SCBD) Elution Profiles and Molecular Weight Distribution (MWD) plots with verification by a GPC chromatograph equipped with an internal IR5 infra-red detector (GPC-IR) for Inventive Polymer 4.

In general, it has been found that approximately 20 solver iterations will typically reach good convergence on the solution using Excel®. If there is a disagreement in order of the peaks versus measured molecular weight by the CEF-MW plot and the observed comonomer wt % measurement measured via GPC-CC, then the data must be reconciled by changing the iteration starting points (temperature or lgMW) in Excel or changing the width and tail factors slightly such that the iteration will proceed with convergence to a consistent solution amongst the measurements, or the resolution of the measurements must be increased, or an additional peak may be added to the CEF-SCBD to better approximate the elution peak shape of the individual components. Such components could be modeled a-priori via several EMG distributions if they are prepared individually. FIG. 3 (Comparative Polymer 7) shows high resolution of CEF-SCBD and lower resolution of GPC-MWD in terms of peak separation, wherein the measured ordering using the LS and IR ratioing methods and the weight fractions allow excellent iteration convergence on the combined solution. In this case the higher-density species (the third ethylene-based component) could be modeled by the sum of 2 EMG peaks, the lowest density peak at 30° C. (of which is attributed the soluble fraction) can be modeled by the sum of 2 discreetly-separated EMG peaks, and each middle component can be modeled from a single EMG peak. FIG. 4 (Inventive Polymer 4) demonstrates an example of acceptable convergence of a very high density, low molecular weight component made with a Ziegler-Natta catalyst and two moderate density components (made via two different single-site catalysts) using a single peak for each.

Additionally a predicted $M_{w(CEF)}$ response for CEF-MW may be generated by using the weight-average molecular weight by GPC-MWD of each of the components multiplied by the observed weight fraction of each of the components at each point along the CEF-SCBD plot. The predicted $M_{w(CEF)}$ needs to be in agreement with the measured $M_{w(CEF)}$ in the CEF-MW plot. By plotting comonomer incorporation as a function of elution temperature based on a series of known copolymer standards, the GPC-CC plot can also be predicted using the measured $M_{w(CEF)}$ and comonomer incorporation of individual component from CEF-MW and CEF-SCBD plots. The predicted GPC-CC plot needs to be in agreement with the measured GPC-CC.

A peak temperature vs. density correlation for the CEF-SCBD data is obtained using a series of linear ethylene-based polymer standard resins polymerized from single site catalysts of approximately 1 g/10 min melt index ($I_2$), or nominal weight-average molecular weight of approximately 105,000 g/mol by GPC, and polydispersities (or MWD) of less than 2.3 by GPC. At least 10 standard resins of known comonomer content, density, and molecular weight within the density range of 0.87 to 0.96 g/cc are used. Peak temperature and density data are fit with a 5th order polynomial curve to obtain the calibration curve.

A peak width and peak tail vs. peak temperature correlation is obtained similarly by fitting the peak width and peak tail vs. temperature of the above resins with a linear line, which is very useful for initial estimates in the deconvolution process.

The first ethylene-based component and the second ethylene-based component were noted in the inventive resins presented herein directly from the CEF-SCBD deconvolution plot as the first two peaks between 35° C. and 90° C. elution temperature. A "Raw Density" ($Density_{Raw}$) was calculated from these observed peak positions using the calibration curve of peak temperature vs. density. The $Density_{Raw}$ (in g/cc) was corrected to $Density_{True}$ (in g/cc) accounting for molecular weight (in g/mol) contributions by using the Equation 28:

$Density_{True}=Density_{Raw}-0.254$ g/cc×[lg($M_{w(GPC)}$/(g/mol))−5.02]  (Equation 28)

where $M_{w(GPC)}$ is the weight-average molecular weight of the single component deconvoluted from GPC-MWD.

The density of the third ethylene-based component may be calculated based on the known density of the resin, $Density_{True}$ of the first ethylene-based component, $Density_{True}$ of the second ethylene-based component, and the weight fractions of each components according to the following Equation 29.

$$\frac{1}{Density_{measured}} = \frac{\text{weight fraction of 1st ethylenebased component}}{Density_{True} \text{ of 1st ethylenebased component}} + \frac{\text{weight fraction of 2nd ethylenebased component}}{Density_{Ture} \text{ of 2nd ethylenebased component}} + \frac{\text{weight fraction of 3rd ethylenebased component}}{\text{density of 3rd ethylenebased component}}$$ (Equation 29)

The melt index ($I_2$) of each ethylene-based component may be estimated from their weight-average molecular weight by the following equation:

$lg(I_2/(g/10\ min))=-3.759 \times lg(M_{w(GPC)}/(g/mol))+18.9$  (Equation 30)

where $M_{w(GPC)}$ is the weight average molecular weight (in g/mol) of the single component deconvoluted from GPC-MWD curve and $I_2$ is the melt index in (g/10 min). Note that the amount of long chain branching may change the coefficients.

Moreover, for the determination of product composition, direct sampling of a single reactor with a single catalyst with the same reactor conditions, a first reactor sampling for a series dual-reactor configuration, or sampling of both reactors for a parallel dual-reactor configuration may be used to aid in the determination of the density, melt index ($I_2$), GPC-MWD, and CEF-SCBD of each individual component of the multimodal ethylene-based polymer, especially providing that the reaction is effectively killed past the sampling point. This allows better confirmation in cases wherein the first and second ethylene-based component peak positions cannot adequately be determined from the 3-component mixture.

Direct examination and quantitation by analytical cross-fractionation in GPC-TREF, such as the PolymerChar CFC unit (Valencia, Spain) equipped with on-line light scattering and employing similar calibrations in bivariate space representing SCBD and molecular weight and calibrating the relationship to density may be used to measure amounts or discriminate more precisely of each of the components as well, especially for the initial estimates or in cases that may produce high co-crystallization or low resolution/discrimination of species particularly in both MWD and SCBD space. (Development of an Automated Cross-Fractionation Apparatus (TREF-GPC) for a Full Characterization of the Bivariate Distribution of Polyolefins. Polyolefin Characterization. Macromolecular Symposia, Volume 257, 2007, Pages 13-28. A. Ortin, B. Monrabal, J. Sancho-Tello). Adequate resolution must be obtained in both lgMW and temperature space and verification should be done through both direct compositional ratioing, for example, IR-5 and light scattering molecular weight measurement. See Characterization of Chemical Composition along the Molar Mass Distribution in Polyolefin Copolymers by GPC Using a Modern Filter-Based IR Detector. Polyolefin Characterization—ICPC 2012 Macromolecular Symposia Volume 330, 2013, Pages 63-80, A. Ortín, J. Montesinos, E. López, P. del Hierro, B. Monrabal, J. R. Torres-Lapasió, M. C. García-Álvarez-Coque. Deconvolution of the components must use a similar set of equations and analogous calibration verified by a series of single-site resins and resin blends.

Dart

The film Dart Drop test determines the energy that causes a plastic film to fail under specified conditions of impact by a free falling dart. The test result is the energy, expressed in terms of the weight of the missile falling from a specified height, which would result in the failure of 50% of the specimens tested.

Dart Impact Strength (dart) is measured according to ASTM D1709, Method A, suing a 26 inch±0.4 inches (66 cm±1 cm) drop height and a polished aluminum hemispherical head of 38.10±0.13 mm in diameter.

Secant Modulus

The film MD (Machine Direction) 1% Secant Modulus was determined per ASTM D882 at a crosshead speed of 20 inch/minute. The width of the specimen is 1 inch and initial grip separation is 4 inches. The reported 1% Secant Modulus value was the average of five measurements.

EXAMPLES

The following examples illustrate features of the present disclosure but are not intended to limit the scope of the disclosure.

Commercial Polymers Used

The polymers used in the following examples are provided in Table 1.

TABLE 1

| | Density (g/cc) | $I_2$ (g/10 min) | $I_{10}/I_2$ | $M_{w(GPC)}/M_{n(GPC)}$ | $T_{critical}$ (° C.) | CEF weight fraction between 20° C. and $T_{critical}$ | $M_{w(CEF)}$ of CEF fraction between 20° C. and $T_{critical}$ (g/mol) |
|---|---|---|---|---|---|---|---|
| Comparative Polymer 1 (Comp1): DOWLEX ™ 2038.68 (LLDPE) | 0.935 | 1.0 | 7.7 | 4.1 | 84.0 | 10.8% | 39,490 |
| Comparative Polymer 2 (Comp2): ELITE ™ 5111 (bimodal polymer) | 0.925 | 0.9 | 8.5 | 3.8 | 74.1 | 17.5% | 123,397 |
| Comparative Polymer 3 (Comp3): ELITE ™ 5100 (LLDPE) | 0.920 | 0.9 | 8.4 | 3.5 | 67.4 | 16.4% | 116,999 |
| Comparative Polymer 4 (Comp4): Inventive First Composition 4 from WO/2015/200743 (bimodal polymer) | 0.919 | 0.8 | 8.1 | 3.5 | 65.2 | 18.9% | 122,798 |
| Comparative Polymer 5 (Comp5): Inventive First Composition 6 from WO/2015/200743 (bimodal polymer) | 0.916 | 0.8 | 8.1 | 4.1 | 61.9 | 15.4% | 90,927 |
| Comparative Polymer 6 (Comp6): (bimodal polymer) | 0.926 | 0.9 | 7.8 | 3.6 | 74.1 | 11.3% | 93,272 |
| Comparative Polymer 7 (Comp7): (trimodal melt blend) | 0.918 | 0.6 | 8.5 | 4.5 | 65.2 | 17.7% | 239,154 |
| Comparative Polymer 8 (Comp8): (trimodal melt blend) | 0.919 | 0.9 | 8.0 | 3.1 | 66.3 | 21.1% | 158,972 |

TABLE 1-continued

|  | Density (g/cc) | $I_2$ (g/10 min) | $I_{10}/I_2$ | $M_{w(GPC)}/M_{n(GPC)}$ | $T_{critical}$ (° C.) | CEF weight fraction between 20° C. and $T_{critical}$ | $M_{w(CEF)}$ of CEF fraction between 20° C. and $T_{critical}$ (g/mol) |
|---|---|---|---|---|---|---|---|
| Inventive Polymer 1 (Inv1): (trimodal polymer) | 0.919 | 0.6 | 13.6 | 7.1 | 66.3 | 23.6% | 250,015 |
| Inventive Polymer 2 (Inv2): (trimodal polymer) | 0.926 | 0.8 | 10.9 | 7.7 | 74.1 | 37.7% | 182,946 |
| Inventive Polymer 3 (Inv3): (trimodal polymer) | 0.927 | 0.8 | 9.2 | 7.7 | 75.2 | 26.7% | 159,937 |
| Inventive Polymer 4 (Inv4): (trimodal polymer) | 0.936 | 0.9 | 10.5 | 7.6 | 85.1 | 32.4% | 161,643 |
| Inventive Polymer 5 (Inv5): (trimodal polymer) | 0.931 | 0.8 | 10.5 | 7.3 | 79.6 | 31.1% | 173,291 |

Figure 2:
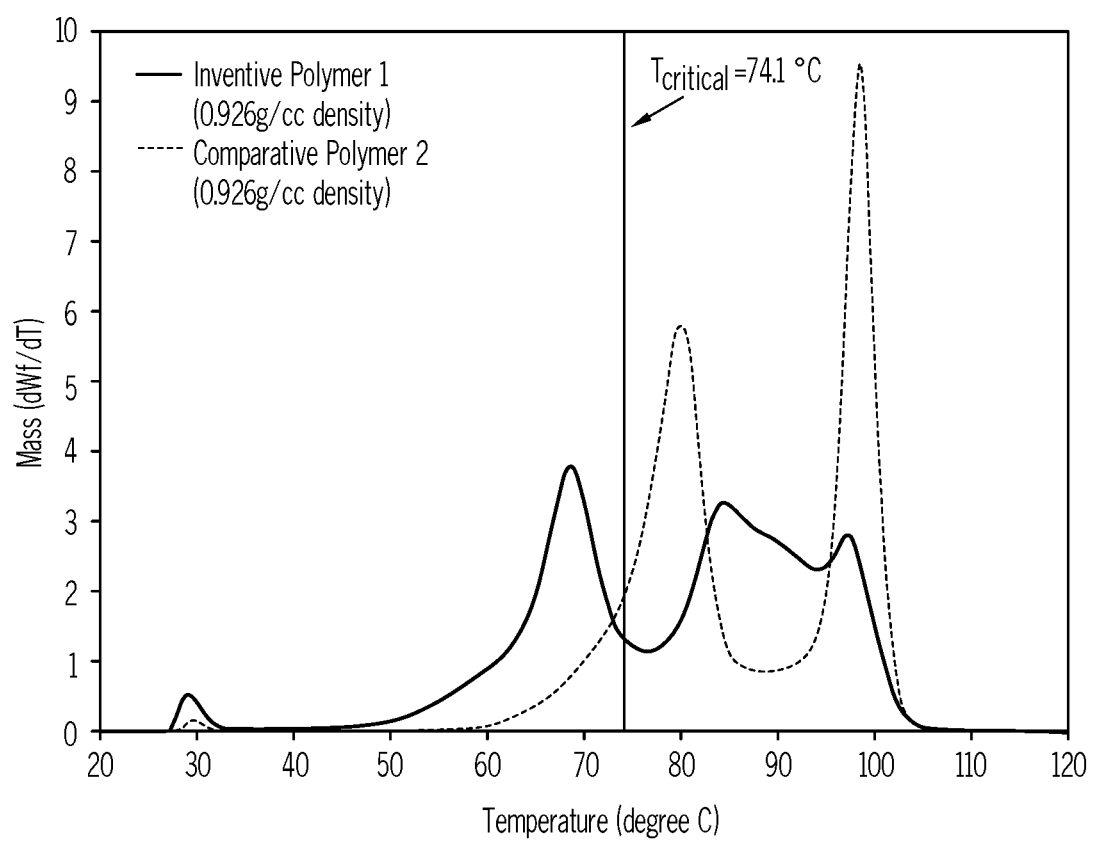
FIG. 2 is a graphical illustration depicting the Crystallization Elution Fractionation (CEF) weight fraction versus temperature for Inventive Polymer 2 and Comparative Polymer 6.

Referring to Table 1 and FIG. 2, Inventive Polymer 2 and Comparative Polymer 6 both had the same density of 0.926 g/cc, and consequently had the same $T_{critical}$ of 74.1° C. In the temperature range between 20° C. and the $T_{critical}$ value of 74.1° C. (reflected with a straight line), the CEF weight fraction is calculated as the area under the curve in these temperature ranges. The y-axis in FIG. 2 is the weight fraction at each temperature (x-axis) from 20.0° C. to 119.9° C. with a temperature step increase of 0.2° C. For Comparative Polymer 2, the CEF weight fraction is 17.5%, whereas Inventive Polymer 1 has a CEF weight fraction of 37.7%. This indicates a higher percentage of lower density first ethylene-based component in Inventive Polymer 2.

The following Table 2 and Table 3 list the density, melt index ($I_2$), weight averaged molecular weight ($M_{w(GPC)}$), number averaged molecular weight ($M_{n(GPC)}$), MWD, and weight percent of the first, second, and third ethylene-based components of inventive multimodal inventive polymers Inv1-Inv5 and the comparative multimodal inventive polymers Comp7-Comp8. Comparative Polymers Comp1-Comp3 are available from The Dow Chemical Company, Midland, Mich.

TABLE 2

|  | Density (g/cc) | | | $M_{w(GPC)}$ (g/mol) | | | $M_w/M_n$ | | |
|---|---|---|---|---|---|---|---|---|---|
|  | 1 | 2 | 3* | 1 | 2 | 3 | 1 | 2 | 3 |
| Comp7 | 0.877 | 0.903 | 0.942 | 333,493 | 138,720 | 57,391 | 2.1 | 2.1 | 2.9 |
| Comp8 | 0.875 | 0.897 | 0.946 | 300,649 | 128,960 | 55,408 | 2.3 | 2.4 | 2.1 |
| Inv1 | 0.875 | 0.900 | 0.945 | 347,363 | 161,883 | 40,239 | 2.1 | 2.1 | 3.2 |
| Inv2 | 0.891 | 0.912 | 0.957 | 236,961 | 130,724 | 19,929 | 2.2 | 2.0 | 3.0 |
| Inv3 | 0.895 | 0.916 | 0.957 | 236,216 | 119,947 | 22,023 | 2.2 | 2.0 | 4.0 |
| Inv4 | 0.903 | 0.923 | 0.962 | 256,117 | 122,071 | 22,015 | 2.3 | 2.0 | 3.2 |
| Inv5 | 0.898 | 0.918 | 0.957 | 244,179 | 127,907 | 24,961 | 2.2 | 2.1 | 3.6 |

TABLE 3

|  | $I_2$ (g/10 min) | | | Weight percent (Wt. %) | | |
|---|---|---|---|---|---|---|
|  | 1 | 2 | 3 | 1 | 2 | 3 |
| Comp7 | 0.014 | 0.37 | 10 | 17.58 | 30.31 | 52.10 |
| Comp8 | 0.02 | 0.49 | 12 | 11.98 | 36.22 | 51.80 |
| Inv1 | 0.012 | 0.21 | 39 | 20.58 | 23.53 | 55.89 |
| Inv2 | 0.05 | 0.46 | 545 | 29.89 | 22.86 | 47.26 |
| Inv3 | 0.05 | 0.64 | 374 | 26.80 | 31.39 | 41.81 |
| Inv4 | 0.04 | 0.60 | 375 | 27.68 | 23.76 | 48.56 |
| Inv5 | 0.04 | 0.50 | 234 | 26.64 | 24.36 | 49.00 |

1 = first ethylene-based component
2 = second ethylene-based component
3 = third ethylene-based component
*density of the third ethylene-based component calculated based according to Equations 29

Referring to Table 1, Comparative Polymers 4 and 5 were bimodal ethylene-octene copolymers prepared via solution polymerization in a dual loop reactor system with a first catalyst system in the first reactor and a second catalyst system in the second reactor. Comparative Polymers 4 and 5 correlate to Inventive First Compositions 4 and 6 from WO/2015/200743, respectively.

The Inventive Polymers Inv1-Inv5 and the Comparative Polymers Comp6-Comp8 were prepared according to the following process and based on the reaction conditions reported in Tables 4 and 5. The reactor configuration was dual series reactor operation.

In the dual series reactor configuration, the effluent from the first polymerization reactor (containing solvent, monomer, comonomer, hydrogen, catalyst components, and dissolved polymer) exited the first reactor and is added to the second reactor separate from the other feeds to the second reactor. The reactor type can be a liquid full, adiabatic, continuously stirred tank reactor (CSTR) or a liquid full, non-adiabatic, isothermal, circulating, loop reactor, which mimics a continuously stirred tank reactor (CSTR) with heat removal. The final reactor effluent (second reactor effluent for dual series) entered a zone where it is deactivated with the addition of and reaction with a suitable reagent (water). At this reactor exit location, other additives were injected for polymer stabilization.

Following catalyst deactivation and additive addition, the reactor effluent entered a devolatilization system where the polymer was removed from the non-polymer stream. The non-polymer stream was removed from the system. The isolated polymer melt was pelletized and collected.

All raw materials (monomer and comonomer) and the process solvent (a narrow boiling range high-purity paraffinic solvent, ISOPAR E) were purified with molecular sieves before introduction into the reaction environment. Hydrogen was supplied pressurized as a high purity grade and was not further purified. The reactor monomer feed stream was pressurized via a mechanical compressor to above reaction pressure. The solvent feed was pressurized via a pump to above reaction pressure. The comonomer feed was pressurized via a pump to above reaction pressure. The individual catalyst components were manually batch diluted to specified component concentrations with purified solvent and pressurized to above reaction pressure. All reaction feed flows were measured with mass flow meters and independently controlled with metering pumps.

Independent control of all fresh solvent, monomer, comonomer, hydrogen, and catalyst component feeds to each reactor was utilized. The total fresh feed streams to each reactor (solvent, monomer, comonomer, and hydrogen) were temperature controlled by passing the feed stream through a heat exchanger. The total fresh feed to each polymerization reactor was injected into the reactor in one or more locations. The catalyst components were injected into the polymerization reactor separate from the other feeds. An agitator in a CSTR reactor or a series of static mixing elements in a loop reactor was responsible for continuous mixing of the reactants. Oil bath (for a CSTR reactor) and heat exchanger (for a loop reactor) provided fine tuning of the reactor temperature control.

For reactors utilizing a single primary catalyst in each reactor (e.g. Comp6), the one primary catalyst component was computer controlled to maintain the individual reactor monomer conversion at the specified target. The cocatalyst components for the single primary catalyst reactor were fed based on calculated specified molar ratios to the one primary catalyst component. For the reactor utilizing dual primary catalysts in one reactor (e.g. Inv1-Inv5 and Comp7-Comp8), two calculated variables are controlled: (1) the total mass flow of primary catalyst 1 and primary catalyst 2, and (2) the mass fraction for primary catalyst 1 out of the total mass flow of both primary catalysts. The total mass flow of both primary catalysts was computer controlled to maintain the individual reactor monomer conversion at the specified target. The mass fraction of primary catalyst 1 was controlled to maintain the relative mass fraction of polymer produced by each catalyst in that individual reactor. The cocatalyst components for the reactor utilizing dual primary catalysts were fed based on calculated specified molar ratios to the total of both primary catalyst components.

For Inv1-Inv5 and Comp8, the dual series reactor system consisted of two liquid full, adiabatic, continuously stirred tank reactors (CSTRs). For Comp7, the dual series reactor system consisted of one liquid full, adiabatic, continuously stirred tank reactor (CSTR) and one liquid full, non-adiabatic, isothermal, circulating, loop reactor which mimics a continuously stirred tank reactor (CSTR) with heat removal. The adiabatic CSTR is the second reactor. Comparative Polymer 6 (Comp6) was a bimodal ethylene-octene copolymer prepared via solution polymerization in a dual loop reactor system with a first catalyst system in the first reactor, and a second catalyst system in the second reactor. It was prepared under similar conditions disclosed in WO/2015/200743 for producing the Inventive First Composition 7. Reactor conditions are included in Table 5. The dual series reactor system consisted of two liquid full, non-adiabatic, isothermal, circulating, loop reactors.

TABLE 4

| | | Inv1 | Inv2 | Inv3 |
|---|---|---|---|---|
| Reactor Configuration | Type | Dual Series | Dual Series | Dual Series |
| Comonomer type | Type | 1-octene | 1-octene | 1-octene |
| First Reactor Feed Solvent/Ethylene Mass Flow Ratio | g/g | 7.5 | 8.1 | 8.2 |
| First Reactor Feed Comonomer/Ethylene Mass Flow Ratio | g/g | 0.72 | 0.46 | 0.37 |
| First Reactor Feed Hydrogen/Ethylene Mass Flow Ratio | g/g | 2.18E−04 | 3.00E−04 | 3.73E−04 |
| First Reactor Temperature | °C. | 150 | 150 | 150 |
| First Reactor Pressure | barg | 36 | 28 | 28 |
| First Reactor Ethylene Conversion | % | 74.3 | 77.2 | 77.0 |
| First Reactor Catalyst 1 Type | Type | CAT-A | CAT-A | CAT-A |
| First Reactor Catalyst 2 Type | Type | CAT-B | CAT-B | CAT-B |
| First Reactor Catalyst 1 wt. % Active Metal Mass Fraction (Hf/(Hf + Zr)) | | 81.0 | 76.6 | 82.2 |
| First Reactor Cocatalyst 1 Type | Type | CO-CAT-1 | CO-CAT-1 | CO-CAT-1 |
| First Reactor Cocatalyst 2 Type | Type | CO-CAT-2 | CO-CAT-2 | CO-CAT-2 |
| First Reactor, Molar ratio of Boron in Cocatalyst 1 to Total metal in Catalysts 1 and 2 | Ratio | 1.2 | 1.2 | 1.2 |
| First Reactor, Molar ratio of Aluminum in Cocatalyst 2 to Total Metal in Catalysts 1 and 2 | Ratio | 20 | 15 | 12 |
| Second Reactor Feed Solvent/Ethylene Mass Flow Ratio | g/g | 3.8 | 5.3 | 5.3 |
| Second Reactor Feed Comonomer/Ethylene Mass Flow Ratio | g/g | 0.19 | 0.00 | 0.00 |
| Second Reactor Feed Hydrogen/Ethylene Mass Flow Ratio | g/g | 1.83E−03 | 1.72E−03 | 2.82E−03 |
| Second Reactor Temperature | °C. | 196 | 210 | 210 |
| Second Reactor Pressure | barg | 37 | 28 | 28 |
| Second Reactor Ethylene Conversion | % | 75.6 | 83.0 | 82.5 |
| Second Reactor Catalyst Type | Type | CAT-D | CAT-D | CAT-D |
| Second Reactor Cocatalyst Type | Type | CO-CAT-3 | CO-CAT-3 | CO-CAT-3 |
| Second Reactor Cocatalyst to Catalyst, Al to Ti molar ratio | mol/mol | 4.0 | 4.6 | 6.8 |

TABLE 5

|  |  | Inv4 | Inv5 | Comp7 | Comp8 |
|---|---|---|---|---|---|
| Reactor Configuration | Type | Dual Series | Dual Series | Dual Series | Dual Series |
| Comonomer type | Type | 1-octene | 1-octene | 1-octene | 1-octene |
| First Reactor Feed Solvent/Ethylene Mass Flow Ratio | g/g | 8.3 | 8.3 | 7.5 | 8.7 |
| First Reactor Feed Comonomer/Ethylene Mass Flow Ratio | g/g | 0.22 | 0.29 | 0.65 | 0.77 |
| First Reactor Feed Hydrogen/Ethylene Mass Flow Ratio | g/g | 3.95E−04 | 3.39E−04 | 2.5E−04 | 2.0E−04 |
| First Reactor Temperature | °C. | 150 | 150 | 150 | 160 |
| First Reactor Pressure | barg | 28 | 28 | 33 | 28 |
| First Reactor Ethylene Conversion | % | 82.0 | 81.4 | 72.6 | 84.6 |
| First Reactor Catalyst 1 Type | Type | CAT-A | CAT-A | CAT-A | CAT-C |
| First Reactor Catalyst 2 Type | Type | CAT-B | CAT-B | CAT-B | CAT-B |
| First Reactor Catalyst 1 Active Metal Mass Fraction (Hf/(Hf + Zr)) | wt. % | 66.2 | 63.6 | 77.4 | 60.3 |
| First Reactor Cocatalyst 1 Type | Type | CO-CAT-1 | CO-CAT-1 | CO-CAT-1 | CO-CAT-1 |
| First Reactor Cocatalyst 2 Type | Type | CO-CAT-2 | CO-CAT-2 | CO-CAT-2 | CO-CAT-2 |
| First Reactor, Molar ratio of Boron in Cocatalyst 1 to Total metal in Catalysts 1 and 2 | Ratio | 1.2 | 1.2 | 1.3 | 1.3 |
| First Reactor, Molar ratio of Aluminum in Cocatalyst 2 to Total Metal in Catalysts 1 and 2 | Ratio | 291 | 278 | 31.8 | 4.5 |
| Second Reactor Feed Solvent/Ethylene Mass Flow Ratio | g/g | 5.3 | 5.3 | 3.6 | 5.9 |
| Second Reactor Feed Comonomer/Ethylene Mass Flow Ratio | g/g | 0.00 | 0.00 | 0.18 | 0.20 |
| Second Reactor Feed Hydrogen/Ethylene Mass Flow Ratio | g/g | 1.72E−03 | 1.72E−03 | 4.17E−04 | 8.16E−05 |
| Second Reactor Temperature | °C. | 209 | 210 | 195 | 190 |
| Second Reactor Pressure | barg | 34 | 34 | 33 | 34 |
| Second Reactor Ethylene Conversion | % | 83.0 | 83.3 | 68.7 | 86.1 |
| Second Reactor Catalyst Type | Type | CAT-D | CAT-D | CAT-D | CAT-D |
| Second Reactor Cocatalyst Type | Type | CO-CAT-3 | CO-CAT-3 | CO-CAT-3 | CO-CAT-3 |
| Second Reactor Cocatalyst to Catalyst, Al to Ti molar ratio | mol/mol | 4.3 | 4.0 | 4.0 | 5.9 |

Formulas of Catalyst A, Catalyst B and Catalyst C for making Inventive Polymers 1-6 and Comparative Polymers 7 and 8 are shown below.

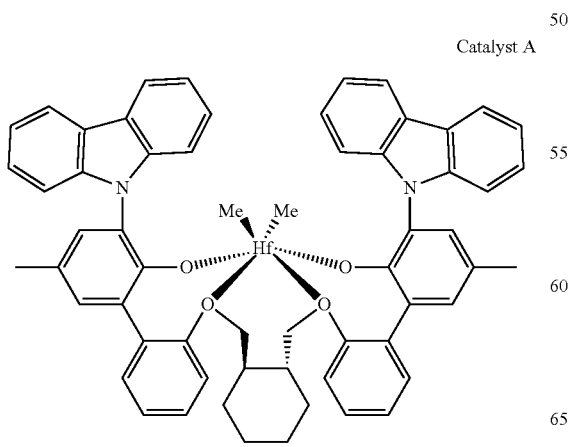

Catalyst A

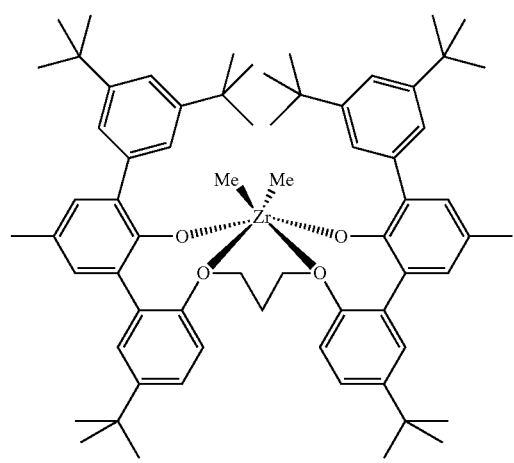

Catalyst B

-continued

-continued

Catalyst C

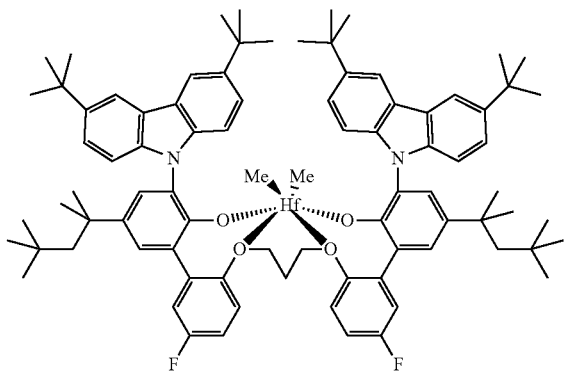

Catalyst D is a Ziegler-Natta catalyst. The heterogeneous Ziegler-Natta type catalyst-premix was prepared substantially according to U.S. Pat. No. 4,612,300, by sequentially adding to a volume of ISOPAR-E, a slurry of anhydrous magnesium chloride in ISOPAR-E, a solution of EtAlCl$_2$ in heptane, and a solution of Ti(O-iPr)$_4$ in heptane, to yield a composition containing a magnesium concentration of 0.20M, and a ratio of Mg/Al/Ti of 40/12.5/3. An aliquot of this composition was further diluted with ISOPAR-E to yield a final concentration of 500 ppm Ti in the slurry. While being fed to, and prior to entry into, the polymerization reactor, the catalyst premix was contacted with a dilute solution of triethylaluminum (Et$_3$Al), in the molar Al to Ti ratio specified in Table 4 and Table 5, to give the active catalyst. The cocatalysts composition are listed in Table 6 below.

TABLE 6

| Description | Chemical Name |
|---|---|
| CO-CAT-1 | bis(hydrogenated tallow alkyl)methylammonium tetrakis(pentafluorophenyl)borate(1−) |
| CO-CAT-2 | Aluminoxanes, iso-Bu Me, branched, cyclic and linear; modified methyl aluminoxane |
| CO-CAT-3 | Et$_3$Al (Triethylaluminum) |

Monolayer Blown Films 1 mil blown films were made using a 3-layer Dr. Collin blown film line. The line comprises three 25:1 L/D single screw extruders, equipped with grooved feed zones. The screw diameters were 25 mm for the inner layer, 30 mm for the core and 25 mm for the outer layer. Resins listed in Table 1 were fed into all three extruders at the same time to make monolayer films. The annular die was 60 mm in diameter and used a dual lip air ring cooling system. The die lip gap was 2 mm and the blow up ratio (BUR) was 2.5. The lay flat width was around 23 to 24 cm. The frost line height was 5.5 inches. The total output rate was 9 kg/hour (3 kg/hour for each extruder). The melt temperature was 210-220° C., and the die temperature was set at 210° C.

TABLE 7

| Monolayer films | | |
|---|---|---|
| Sample Name | 1% Sec. Mod. MD (psi) | Dart A (g) |
| Comparative Film 1: Comp1 | 57,899 | 67 |
| Comparative Film 2: Comp2 | 35,215 | 283 |
| Comparative Film 3: Comp3 | 27,118 | 367 |
| Comparative Film 4: Comp4 | 35,231 | 1460 |
| Comparative Film 5: Comp5 | 32,323 | 688 |
| Comparative Film 6: Comp6 | 54,993 | 409 |
| Comparative Film 7: Comp7 | 34,664 | 1360 |
| Comparative Film 8: Comp8 | 33,585 | 598 |
| Inventive Film 1: Inv1 | 33,952 | 1670 |
| Inventive Film 2: Inv2 | 47,696 | 1070 |
| Inventive Film 3: Inv3 | 48,783 | 876 |
| Inventive Film 4: Inv4 | 78,201 | 194 |
| Inventive Film 5: Inv5 | 57,521 | 421 |

Referring to the results in Table 7 and the graph of FIG. 1, the inventive samples show better toughness than the comparative samples. For example, Comparative Film 8 has a 1% secant modulus of 33,585 psi and a Dart A value of 598 g. As a further note, Inventive Film 1, included a trimodal polymer having 20.58% by weight of the first ethylene-based component and a CEF weight fraction between 20° C. and T$_{critical}$ of 23.6%, whereas Comparative Film 8 included a trimodal polymer having 11.98% by weight of the first ethylene-based component and a CEF weight fraction between 20° C. and T$_{critical}$ of 21.1%. From a property standpoint, Inventive Film 1 has a close 1% secant modulus of 33,952 psi (a 367 psi difference), yet Inventive Film 1 has a Dart A value of 1670 g, which is over 2.5 times the dart value of Comparative Film 8. This shows that trimodal polymers having greater than 20% by weight of the first ethylene-based component achieve a better combination 1% Secant Modulus and Dart Value. Comparing the comparative film and inventive films in Table 7, it is clear that the inventive films have a much higher combination of 1% Secant Modulus and Dart Value. Referring to FIG. 1, the relationship between Dart Strength and 1% secant modulus for the inventive films in Table 7 can be defined by the following equation:

$$\text{Dart (g)} > -0.05294 \text{ (g/psi)} * 1\% MD \text{ secant modulus (psi)} + 3388 \text{ (g)} \quad \text{(Equation 31)}$$

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:
1. A polymer composition comprising:
at least one multimodal ethylene-based polymer having a density from 0.900 to 0.940 g/cc when measured according to ASTM D792 and a melt index (I$_2$) from 0.1 to 10 g/10 min when measured according to ASTM D1238 at a load of 2.16 kg and temperature of 190° C., the multimodal ethylene-based polymer comprising a first ethylene-based component, a second ethylene-based component, and a third ethylene-based component, wherein each of the first ethylene-based component, the second ethylene-based component, and the third ethylene-based component are polymerized reaction products of ethylene monomer and at least one C$_3$-C$_{12}$ α-olefin comonomer, wherein;
the first ethylene-based component has a density of 0.860 to 0.915 g/cc, and a weight-average molecular weight (M$_{w(GPC)}$) of 128,000 g/mol to 363,000 g/mol, the multimodal ethylene-based polymer comprising at least 20% by weight of the first ethylene-based component;

the second ethylene-based component has a density greater than the density of the first ethylene-based component and less than 0.940 g/cc, and a weight-average molecular weight ($M_{w(GPC)}$) of 88,500 g/mol to 363,000 g/mol, and the third ethylene-based component has a density greater than the density of the second ethylene-based component.

2. The polymer composition of claim 1, wherein the first ethylene-based component has a $C_3$-$C_{12}$ α-olefin comonomer incorporation of at least 0.5 mol %, and the second ethylene-based component has a $C_3$-$C_{12}$ α-olefin comonomer incorporation of at least 0.5 mol %.

3. The polymer composition of claim 1, wherein the multimodal ethylene-based polymer comprises from 20 to 40% by weight of the first ethylene-based component, from 10 to 40% by weight of the second ethylene-based component, 25 to 60% by weight of the third ethylene-based component.

4. The polymer composition of claim 1, wherein the melt index ($I_2$) of the multimodal ethylene-based polymer is from 0.3 to 2.0 g/10 min.

5. The polymer composition of claim 1, wherein the multimodal ethylene-based polymer has an $I_{10}/I_2$ value from 9 to 15, where $I_{10}$ is measured according to ASTM D1238 at a load of 10 kg and temperature of 190° C.

6. The polymer composition of claim 1, wherein the density of the multimodal ethylene-based polymer is from 0.910 to 0.940 g/cc.

7. The polymer composition of claim 1, wherein the density of the first ethylene-based component is from 0.865 to 0.910 g/cc, and the melt index ($I_2$) of the first ethylene-based component is from 0.01 to 0.2 g/10 min.

8. The polymer composition of claim 1, wherein the density of the second ethylene-based component is from 0.880 to 0.930 g/cc, and the melt index ($I_2$) of the second ethylene-based component is from 0.2 to 1.0 g/10 min.

9. The polymer composition of claim 1, wherein the density of the third ethylene-based component is from 0.935 to 0.965 g/cc, and a weight-average molecular weight ($M_{w(GPC)}$) is less than 88,500 g/mol.

10. The polymer composition of claim 1, wherein the $C_3$-$C_{12}$ comonomer is 1-octene or 1-hexene.

11. The polymer composition of claim 1, wherein the multimodal ethylene-based polymer has a molecular weight distribution ($M_{w(GPC)}/M_{n(GPC)}$) of at least 5.

12. The polymer composition of claim 1, wherein the third ethylene-based component has a melt index ($I_2$) from 20 to 750 g/10 mins.

13. The polymer composition of claim 1, wherein the multimodal ethylene-based polymer comprises 35 to 60% by weight of the third ethylene-based component.

14. The polymer composition of claim 1, wherein the multimodal ethylene-based polymer has a crystallization elution fractionation (CEF) weight fraction greater than 23% and a weight-average molecular weight ($M_{w(CEF)}$ greater than 100,000 g/mol at a temperature range from 20° C. to $T_{critical}$ ($T_c$).

15. An article comprising the polymer composition of claim 1, wherein the article is a blown or cast film.

16. The polymer composition of claim 1, wherein the multimodal ethylene-based polymer has a molecular weight distribution ($M_{w(GPC)}/M_{n(GPC)}$) of from 5 to 12.

* * * * *